(12) United States Patent
Iwahashi

(10) Patent No.: US 8,610,563 B2
(45) Date of Patent: Dec. 17, 2013

(54) TAG INFORMATION PROCESSING APPARATUS

(75) Inventor: Naomasa Iwahashi, Kyoto (JP)

(73) Assignee: Omron Corporation, Kyoto (JP)

( * ) Notice: Subject to any disclaimer, the term of this patent is extended or adjusted under 35 U.S.C. 154(b) by 443 days.

(21) Appl. No.: 12/920,454

(22) PCT Filed: Feb. 18, 2009

(86) PCT No.: PCT/JP2009/052793
§ 371 (c)(1),
(2), (4) Date: Aug. 31, 2010

(87) PCT Pub. No.: WO2009/110317
PCT Pub. Date: Sep. 11, 2009

(65) Prior Publication Data
US 2011/0001621 A1    Jan. 6, 2011

(30) Foreign Application Priority Data

Mar. 5, 2008    (JP) .................................. 2008-055392

(51) Int. Cl.
*G08B 1/08* (2006.01)
(52) U.S. Cl.
USPC .................. 340/539.13; 340/539.32; 340/8.1; 340/5.92; 340/10.1; 700/213; 700/215
(58) Field of Classification Search
USPC ............. 340/572.1–572.9, 10.1–10.6, 539.1, 340/539.11, 539.13, 539.32, 5.92, 8.1; 342/42, 51, 44; 705/28, 22–23; 700/213–215, 221–222, 224–230
See application file for complete search history.

(56) References Cited

U.S. PATENT DOCUMENTS

| | | |
|---|---|---|
| 2005/0134497 A1 | 6/2005 | Mafune et al. |
| 2008/0001748 A1* | 1/2008 | Childress et al. .......... 340/572.1 |
| 2009/0051537 A1 | 2/2009 | Konishi et al. |
| 2009/0284350 A1 | 11/2009 | Konishi et al. |

FOREIGN PATENT DOCUMENTS

| | | |
|---|---|---|
| GB | 2 429 559 A | 2/2007 |
| JP | 8-133424 A | 5/1996 |
| JP | 2005-140542 A | 6/2005 |
| JP | 2006-127355 A | 5/2006 |
| JP | 2006-134242 A | 5/2006 |

(Continued)

*Primary Examiner* — Brian Zimmerman
*Assistant Examiner* — Laura Nguyen
(74) *Attorney, Agent, or Firm* — Dickstein Shapiro LLP

(57) ABSTRACT

A tag information processing apparatus, including: a receiving section (101) for receiving read-out information of an RFID tag (100), the read-out information obtained through N reading operations (where N represents an integer equal to or greater than 2) carried out for an RFID tag-reading area; a detection frequency information obtaining section (102) for obtaining detection frequency information on the basis of the read-out information received by the receiving section (101), the detection frequency information indicating a detection frequency at which the read-out information of the RFID tag (100) is detected in the N reading operations; a movement determining section (103) for determining whether or not the RFID tag (100) has been moved out of the RFID tag-reading area, wherein, in a case where the detection frequency information obtained by the detection frequency information obtaining section (102) indicates that the detection frequency at which the read-out information of the RFID tag (100) is detected is low, the movement determining section (103) determines that the RFID tag (100) has been moved out of the RFID tag-reading area; and an output section (104) for outputting a result of the determination made by the movement determining section (103).

11 Claims, 14 Drawing Sheets

(56) References Cited

FOREIGN PATENT DOCUMENTS

| | | |
|---|---|---|
| JP | 2006-313530 A | 11/2006 |
| JP | 2007-22782 A | 2/2007 |
| JP | 2007-72880 A | 3/2007 |
| JP | 2007-108946 A | 4/2007 |
| WO | WO/2007/023274 | 3/2007 |
| WO | WO 2007/058301 A1 | 5/2007 |
| WO | WO 2008/092366 A1 | 8/2008 |

* cited by examiner

FIG. 5

| Read-out information 1 |
|---|
| T201 |
| T202 |
| T203 |
| T204 |

FIG. 6

| Read-out information 1 |
|---|
| T202 |
| T204 |
| T205 |

| Read-out information 2 |
|---|
| T201 |
| T202 |
| T203 |
| T204 |

FIG. 7

| Read-out information 1 |
|---|
| T202 |
| T203 |
| T204 |

........

| Read-out information (N-2) |
|---|
| T202 |
| T204 |

| Read-out information (N-1) |
|---|
| T202 |
| T204 |
| T205 |

| Read-out information N |
|---|
| T201 |
| T202 |
| T203 |
| T204 |

FIG. 8

| ID | Tag Attribute |
|---|---|
| T201 | Moved Tag |
| T202 | Staying Tag |
| T203 | Staying Tag |
| T204 | Staying Tag |

| ID | Moved Out of First Area | Moved Out of Second Area |
|---|---|---|
| T20010 | 1 | 0 |

TAG INFORMATION PROCESSING APPARATUS

TECHNICAL FIELD

The present invention relates to (i) a tag information processing apparatus which processes information read from an RFID (Radio Frequency Identification) tag, and (ii) the like.

BACKGROUND ART

Conventionally, there has been known a method for managing, by using RFID tags, materials which are moved in and out via a plurality of points, the method including the steps of:

registering the materials and data of IC tags attached to the respective materials in such a way that each of the materials and the data corresponding thereto are associated with each other;

transmitting and receiving information on the materials and the IC tags corresponding thereto at times of the materials being moved in and out; and checking the registered information on the materials and the IC tags corresponding thereto at the times of the materials being moved in and out (for example, refer to Patent Literature 1).

PATENT LITERATURE 1

Japanese Patent Application Publication, Tokukaihei, No. 8-133424 A (Publication Date: May 28, 1996) (see especially page 1 and FIG. 1)

However, the conventional tag information processing apparatus has involved the following problem. If (i) a tag being moved for entering/leaving or for being received/sent and (ii) a tag staying are present in an RFID tag-reading area, then the tag staying is read all the time. As a result, it is not possible to determine (a) which tag is being moved and (b) which tag is staying within the RFID tag-reading area.

For example, assume that an antenna etc. for reading information of RFID tags is provided near a gate, through which parcels enter or leave. If a parcel which has an RFID tag but should not be transported stays within an area (i.e., RFID tag-reading area) reached by radio waves emitted by the antenna, then the tag information processing apparatus not only reads information of a tag of a parcel which passes through the gate so as to be transported, but also reads, all the time, information of a tag of the parcel staying near the gate. That is, the conventional tag information processing apparatus has not been capable of selectively reading only (i) information of a tag of a parcel which is being moved out of an RFID tag-reading area or (ii) information of a tag of a parcel staying within the RFID tag-reading area.

SUMMARY OF INVENTION

A tag information processing apparatus of the present invention includes: a receiving section for receiving read-out information of an RFID tag, the read-out information obtained through N reading operations (where N represents an integer equal to or greater than 2) carried out for an RFID tag-reading area; a detection frequency information obtaining section for obtaining detection frequency information on the basis of the read-out information received by the receiving section, the detection frequency information indicating a detection frequency at which the read-out information of the RFID tag is detected in the N reading operations; a movement determining section for determining whether or not the RFID tag has been moved out of the RFID tag-reading area, wherein, in a case where the detection frequency information obtained by the detection frequency information obtaining section indicates that the detection frequency at which the read-out information of the RFID tag is detected is low, the movement determining section determines that the RFID tag has been moved out of the RFID tag-reading area; and an output section for outputting a result of the determination made by the movement determining section.

A tag information processing system of the present invention includes: a transmitting/receiving antenna for transmitting and receiving radio waves to and from an RFID tag-reading area; a tag reader/writer for obtaining read-out information of an RFID tag in the RFID tag-reading area by carrying out, via the transmitting/receiving antenna, N reading operations (where N represents an integer equal to or greater than 2) for the RFID tag-reading area; a receiving section for receiving the read-out information obtained by the tag reader/writer; a detection frequency information obtaining section for obtaining detection frequency information on the basis of the read-out information received by the receiving section, the detection frequency information indicating a detection frequency at which the read-out information of the RFID tag is detected in the N reading operations; a movement determining section for determining whether or not the RFID tag has been moved out of the RFID tag-reading area, wherein, in a case where the detection frequency information obtained by the detection frequency information obtaining section indicates that the detection frequency at which the read-out information of the RFID tag is detected is low, the movement determining section determines that the RFID tag has been moved out of the RFID tag-reading area; and an output section for outputting a result of the determination made by the movement determining section.

The tag information processing system of the present invention includes: a transmitting/receiving antenna for transmitting and receiving radio waves to and from an RFID tag-reading area; a tag reader/writer for obtaining read-out information of an RFID tag being present in the RFID tag-reading area by carrying out, via the transmitting/receiving antenna, reading operations for the RFID tag-reading area at predetermined timings; a receiving section for receiving, out of the read-out information obtained by the tag reader/writer, read-out information obtained in last N reading operations (where N represents an integer equal to or greater than 2); a detection frequency information obtaining section for obtaining detection frequency information on the basis of the read-out information received by the receiving section, the detection frequency information indicating a detection frequency at which the read-out information of the RFID tag is detected in the N reading operations; a movement determining section for determining whether or not the RFID tag has been moved out of the RFID tag-reading area, wherein, in a case where the detection frequency information obtained by the detection frequency information obtaining section indicates that the detection frequency at which the read-out information of the RFID tag is detected is low, the movement determining section determines that the RFID tag has been moved out of the RFID tag-reading area; and an output section for outputting a result of the determination made by the movement determining section.

According to the tag information processing apparatus of the present invention, it is possible to determine whether or not the RFID tag is being moved out of the RFID tag-reading area.

The tag information processing apparatus of the present invention includes: a first receiving section for receiving first read-out information of an RFID tag, the first read-out information obtained through N reading operations (where N represents an integer equal to or greater than 2) carried out for a first area; a second receiving section for receiving second read-out information of the RFID tag, the second read-out information obtained through L reading operations (where L represents an integer equal to or greater than 2) carried out for a second area which does not overlap the first area; a first detection frequency information obtaining section for obtaining first detection frequency information on the basis of the first read-out information received by the first receiving section, the first detection frequency information indicating a detection frequency at which the first read-out information of the RFID tag is detected in the N reading operations carried out for the first area; a second detection frequency information obtaining section for obtaining second detection frequency information on the basis of the second read-out information received by the second receiving section, the second detection frequency information indicating a detection frequency at which the second read-out information of the RFID tag is detected in the L reading operations carried out for the second area; a first movement determining section for determining whether or not the RFID tag has been moved out of the first area, wherein, in a case where the first detection frequency information obtained by the first detection frequency information obtaining section indicates that the detection frequency at which the first read-out information of the RFID tag is detected is low, the first movement determining section determines that the RFID tag has been moved out of the first area; a second movement determining section for determining whether or not the RFID tag has been moved out of the second area, wherein, in a case where the second detection frequency information obtained by the second detection frequency information obtaining section indicates that the detection frequency at which the second read-out information of the RFID tag is detected is low, the second movement determining section determines that the RFID tag has been moved out of the second area; a movement direction determining section for determining a movement direction on the basis of results of the determination made by the first movement determining section and the determination made by the second movement determining section; and an output section for outputting a result of the determination made by the movement direction determining section.

The tag information processing system of the present invention includes: a first transmitting/receiving antenna for transmitting and receiving radio waves to and from a first area; a first tag reader/writer for obtaining first read-out information of an RFID tag in the first area by carrying out, via the first transmitting/receiving antenna, N reading operations (where N represents an integer equal to or greater than 2) for the first area; a first receiving section for receiving the first read-out information obtained by the first tag reader/writer; a first detection frequency information obtaining section for obtaining first detection frequency information on the basis of the first read-out information received by the first receiving section, the first detection frequency information indicating a detection frequency at which the first read-out information of the RFID tag is detected in the N reading operations carried out for the first area; a second transmitting/receiving antenna for transmitting and receiving radio waves to and from a second area which does not overlap the first area; a second tag reader/writer for obtaining second read-out information of the RFID tag being present in the second area by carrying out, via the second transmitting/receiving antenna, L reading operations (where L represents an integer equal to or greater than 2) for the second area; a second receiving section for receiving the second read-out information obtained by the second tag reader/writer; a second detection frequency information obtaining section for obtaining second detection frequency information on the basis of the second read-out information received by the second receiving section, the second detection frequency information indicating a detection frequency at which the second read-out information of the RFID tag is detected in the L reading operations carried out for the second area; a first movement determining section for determining whether or not the RFID tag has been moved out of the first area, wherein, in a case where the first detection frequency information obtained by the first detection frequency information obtaining section indicates that the detection frequency at which the first read-out information of the RFID tag is detected is low, the first movement determining section determines that the RFID tag has been moved out of the first area; a second movement determining section for determining whether or not the RFID tag has been moved out of the second area, wherein, in a case where the second detection frequency information obtained by the second detection frequency information obtaining section indicates that the detection frequency at which the second read-out information of the RFID tag is detected is low, the second movement determining section determines that the RFID tag has been moved out of the second area; a movement direction determining section for determining a movement direction on the basis of results of the determination made by the first movement determining section and the determination made by the second movement determining section; and an output section for outputting a result of the determination made by the movement direction determining section.

According to the configuration, it is possible to accurately determine the movement direction in which the RFID tag is being moved. Particularly, it is possible to prevent from accidentally determining the movement direction of an RFID tag which is staying within the first area or within the second area.

For a fuller understanding of the nature and advantages of the invention, reference should be made to the ensuing detailed description taken in conjunction with the accompanying drawings.

BRIEF DESCRIPTION OF DRAWINGS

FIG. 5 is a table illustrating one example of read-out information in accordance with the tag information processing system.

FIG. 6 is a table illustrating another example of the read-out information in accordance with the tag information processing system.

FIG. 7 is a table illustrating still another example of the read-out information in accordance with the tag information processing system.

FIG. 8 is a tag ID management table in accordance with the tag information processing system.

Figure 1:
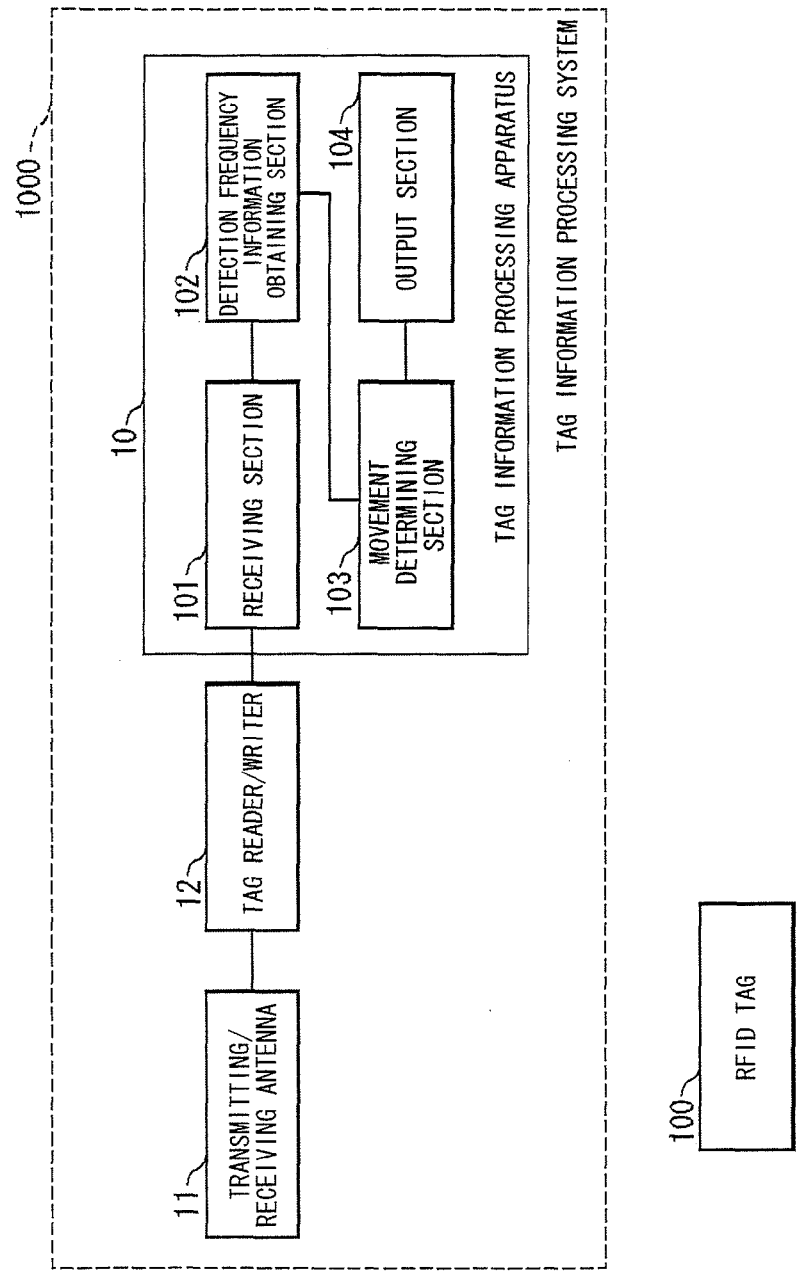
FIG. 1 illustrates a configuration of a tag information processing system of Embodiment 1 of the present invention.

REFERENCE SIGNS LIST 10, 20 Tag information processing apparatus
11 Transmitting/receiving antenna
12 Tag reader/writer
21 First transmitting/receiving antenna
22 First tag reader/writer
23 Second transmitting/receiving antenna
24 Second tag reader/writer
30 Belt conveyer
40 RFID tag-reading area
50 Gate
100, and 100a through 100e RFID tag
101 Receiving section
102 Detection frequency information obtaining section
103 Movement determining section
104, 208 Output section
200, and 200a through 200e Product
201 First receiving section
202 Second receiving section
203 First detection frequency information obtaining section
204 Second detection frequency information obtaining section
205 First movement determining section
206 Second movement determining section
207 Movement direction determining section
221 First area
222 Second area
1000, 1001 Tag information processing system
2000 Information processing device

DESCRIPTION OF EMBODIMENTS

The following description discusses, with reference to the drawings, embodiments of a tag information processing apparatus and the like. Note that in the embodiments, constituent elements having an identical referential numeral carry out an identical operation. Therefore, descriptions for such constituent elements may be omitted from the second appearance thereof.

Embodiment 1

FIG. 1 illustrates a configuration of a tag information processing system, including a tag information processing apparatus, of the present embodiment.

A tag information processing system 1000 includes a tag information processing apparatus 10, a transmitting/receiving antenna 11, and a tag reader/writer 12. Note here that the number of targets to be dealt with by the tag information processing system 1000, i.e., the number of RFID tags 100 whose information is to be read in the tag information processing system 1000, is 1 or greater. In the present embodiment, a description is given for a case where the tag information processing system 100 deals with one (1) RFID tag 100. Note however that the tag information processing system 1000 can deal with also a plurality of RFID tags 100 each having different identification information.

The tag information processing apparatus 10 includes a receiving section 101, a detection frequency information obtaining section 102, a movement determining section 103, and an output section 104.

The tag information processing apparatus 10 receives information, of an RFID tag 100, which is read by the tag reader/writer 12. Then, the tag information processing apparatus 10 determines whether or not the RFID tag 100 has been moved out of an RFID tag-reading area. The RFID tag-reading area is an area for which reading of an RFID tag 100 is carried out. Generally, the tag information processing apparatus 10 is constituted by a computer or the like.

The RFID tag 100 contains information such as identification information, and transmits the information in response to an externally-supplied instruction for the RFID tag 100 to transmit the information. This process is referred to as a reading operation. In the present embodiment, the information read from an RFID tag 100 is for example identification information of the RFID tag 100. The information read from the RFID tag 100 can be any information as long as it contains identification information. The identification information can be any information as long as it identifies the RFID tag 100. Examples of the identification information encompass a production number etc. of the RFID tag 100, a name etc. of the RFID tag 100, and information unique to the RFID tag 100. The RFID tag 100 can have any configuration, and can operate at any frequency band. A plurality of RFID tags 100 can have an identical configuration, or can have different configurations. The RFID tag 100 used here is generally a passive RFID tag. Note however that an active RFID tag can also be used.

The transmitting/receiving antenna 11 is for transmitting and receiving radio waves to and from the RFID tag-reading area, for which reading of an RFID tag 100 is carried out. The transmitting/receiving antenna 11 transmits and receives information of a plurality of RFID tags 100 present in the RFID tag-reading area. For example, the transmitting/receiving antenna 11 is used to (i) transmit the instruction for an RFID tag 100 to transmit its identification information and (ii) receive information such as the identification information transmitted from the RFID tag 100. In the present embodiment, this process of transmitting and receiving information to and from an RFID tag 100, i.e., reading operation of the RFID tag 100, is carried out N times (where N represents an integer equal to or greater than 2) for the RFID tag-reading area where at least one RFID tag 100 is present. The reading operation is preferably carried out N times without intervals. Note that the reading operation may be repeatedly carried out successively or may be carried out N times so that read-out information read in a reading operation of a first set of the N reading operations is used again as read-out information in a reading operation of a second set of the N reading operations which reading operation has the same ordinal number as the reading operation of the first set. The transmitting/receiving antenna 11 can have any directivity etc. In the present embodiment, a description is given for a case where the transmitting/receiving antenna 11 is for use both in transmission and reception. Note however that the transmitting/receiving antenna 11 can be made up of a transmitting antenna and a receiving antenna which are independent of each other. Alternatively, the transmitting/receiving antenna 11 can be constituted by a plurality of antennas.

The tag reader/writer 12 carries out, via the transmitting/receiving antenna 11, N reading operations (where N represents an integer equal to or greater than 2) for the RFID tag-reading area where an RFID tag 100 is present. In this way, the tag reader/writer 12 obtains read-out information read from the RFID tag 100. A specific example of the read-out information encompasses the identification information which identifies the RFID tag 100. The integer N can be any integer as long as it is equal to or greater than 2. Note however that the integer N is preferably equal to or greater than 3 so as to accurately determine a state of the RFID tag 100. This is because, as described later, a successful reading rate of an RFID tag 100 is generally less than 100%. The reading operation is preferably carried out N times without intervals. The reading operation may be repeatedly carried out, or may be carried out N times so that read-out information read in a reading operation of a first set of the N reading operations is used again as read-out information in a reading operation of a second set of the N reading operations which reading operation has the same ordinal number as the reading operation of the first set. Specifically, the tag reader/writer 12 transmits, to each of at least one RFID tag 100 present in the RFID tag-reading area, an instruction for the RFID tag 100 to transmit its read-out information (i.e., identification information). The instruction transmitted by the tag reader/writer 12 is for example a reading command. Further, the tag reader/writer 12 receives the read-out information (i.e., identification information) transmitted from the RFID tag 100 present in the RFID tag-reading area. In this way, the tag reader/writer 12 obtains the read-out information (i.e., identification information). Generally, one reading operation is completed at a time when the tag reader/writer 12 has received read-out information once from each RFID tag 100 that is present in the RFID tag-reading area. The read-out information read out by the tag reader/writer 12 in one reading operation is temporarily stored in a storage medium such as a memory (not illustrated). The tag reader/writer 12 can be constituted by (i) a device which carries out an operation such as reading of an input signal, (ii) a driver of the device, (iii) communication means which transmits and receives information, (iv) a driver of the communication means, for example. In the present embodiment, a description is given for a case where the tag reader/writer 12 itself transmits and receives information. Note however that the tag reader/writer 12 can include a transmitting section and a receiving section. Further, the tag reader/writer 12 can be constituted by an MPU, a memory, and the like. In this case, a software for implementing the operations of the tag reader/writer 12 can be stored in a storage medium such as a ROM.

The receiving section 101 receives the read-out information, of the RFID tag 100, obtained through the N reading operations (where N represents an integer equal to or greater than 2) carried out for the RFID tag-reading area. Note here that the receiving section 101 receives the read-out information for example (i) by receiving an input signal supplied from another device etc., (ii) via input means such as a keyboard, or (iii) by reading the read-out information from a storage medium etc. Generally, the receiving section 10 receives the read-out information every time the reading operation has been completed. Alternatively, the receiving section 10 can receive, at once, the read-out information obtained through the N reading operations. In the present embodiment, a description is given for a case where the receiving section 101 receives the read-out information obtained by the tag reader/writer 12. The receiving section 101 can be constituted by (a) communication means such as receiving means, (b) means for reading information stored in a storage medium, or (c) a device driver of input means such as a numeric keyboard or a keyboard, for example.

The detection frequency information obtaining section 102 obtains, on the basis of the read-out information received by the receiving section 101, detection frequency information indicative of a detection frequency at which the read-out information read from the RFID tag 100 is detected in the N reading operations. Specifically, the detection frequency information obtaining section 102 obtains, on the basis of the read-out information which was read out in the N reading operations and then was temporarily stored in the storage medium or the like by the receiving section 101, detection frequency information indicative of a frequency at which read-out information read from an identical RFID tag 100 is detected (contained) in the read-out information read out in the N reading operations. The detection frequency information can be any information as long as it is possible to determine, on the basis of the information, whether or not the detection frequency is high. Examples of the detection frequency information encompass (i) the number of times the read-out information read from an identical RFID tag 100 is detected, (ii) a ratio of (a) the number of times the read-out information read from the identical RFID tag 100 is detected to (b) the number N of times the reading operation is carried out or to (c) the number of times the read-out information read out from the identical RFID tag 100 is determined whether or not it is detected, or (iii) the like. Specific examples of the detection frequency information are as follows. Assume that the read-out information read from an identical RFID tag 100 is identification information. First, the detection frequency information obtaining section 102 counts the number of times identical identification information is detected in the N reading operations. Then, the detection frequency information obtaining section 102 obtains, as detection frequency information of an RFID tag 100 corresponding to the identical identification information, information indicative of the number of times the identical identification information is detected in the N reading operations. Alternatively, the detection frequency information obtaining section 102 can obtain, as the detection frequency information, a value found by dividing the above number of times by N, (N−1), or the like number. Generally, the detection frequency information obtaining section 102 can be constituted by an MPU, a memory, and the like. Generally, the operations of the detection frequency information obtaining section 102 are implemented by a software, which is stored in a storage medium such as a ROM. Alternatively, the operations can be implemented by a hardware device (e.g., dedicated circuit).

The movement determining section 103 determines, in a case where the detection frequency information obtained by the detection frequency information obtaining section 102 indicates that the detection frequency at which the RFID tag 100 is detected is low, that the RFID tag 100 has been moved out of the RFID tag-reading area. The above determination carried out by the movement determining section 103 can also be regarded as determining, in a case where the detection frequency information obtained by the detection frequency information obtaining section 102 indicates that the detection frequency at which the RFID tag 100 is detected is high, that the RFID tag 100 is staying within the RFID tag-reading area. Further, the above determination can also be regarded as (i) determining, in a case where the detection frequency information obtained by the detection frequency information obtaining section 102 indicates that the detection frequency at which the RFID tag 100 is detected is low, that the RFID tag 100 has been moved out of the RFID tag-reading area, and (ii) determining, in a case where the detection frequency information obtained by the detection frequency information obtaining section 102 indicates that the detection frequency at which the RFID tag 100 is detected is high, that the RFID tag 100 is staying within the RFID tag-reading area. Whether or not the detection frequency indicated by the detection frequency information is high is determined by, for example, (a) comparing the detection frequency with a threshold detection frequency, (b) comparing the detection frequency with a detection frequency, of an RFID tag, which is prepared in advance for the sake of the comparison, or (c) the like. Specifically, the determination is carried out as follows. First, the movement determining section 103 compares, with a threshold detection frequency specified in advance, the detection frequency indicated by the detection frequency information that is obtained by the detection frequency information obtaining section 102. If the detection frequency indicated by the detection frequency information is lower than the threshold detection frequency, then the movement determining section 103 determines that an RFID tag 100 corresponding to this detection frequency information has been moved out of the RFID tag-reading area. On the other hand, if the detection frequency indicated by the detection frequency information is higher than the threshold detection frequency, then the movement determining section 103 determines that the RFID tag 100 corresponding to this detection frequency information has not been moved out of the RFID tag-reading area. That is, the movement determining section 103 determines that the RFID tag 100 corresponding to this detection frequency information is staying within the RFID tag-reading area. For example, assume that the value of the detection frequency information becomes larger as the detection frequency becomes higher. In this case, the movement determining section 103 determines, in a case where the value of the detection frequency information is less than a threshold value, that the RFID tag 100 corresponding to this detection frequency information has been moved out of the RFID tag-reading area. One specific example is as follows. The movement determining section 103 determines, only in a case where the detection frequency information indicates that the number of times the read-out information of an RFID tag 100 is detected in the N reading operations is 1, that the RFID tag 100 has been moved out of the RFID tag-reading area. Generally, the movement determining section 103 can be constituted by an MPU, a memory, and the like. The operations of the movement determining section 103 are generally implemented by a software, which is stored in a storage medium such as a ROM. Note however that the operations can also be implemented by a hardware device (e.g., dedicated circuit).

The output section 104 outputs a result (hereinafter referred to as a determination result) of the determination made by the movement determining section 103. The output section 104 can output the determination result in any form, as long as the determination result is indicative of the RFID tag 100 having been moved out of the RFID tag-reading area. For example, the determination result is information that indicates which one or more of RFID tags 100 have been moved out of the RFID tag-reading area, and which one or more of the RFID tags 100 are staying within the RFID tag-reading area. Alternatively, the determination result can be information indicative of an RFID tag 100 staying within the RFID tag-reading area. Alternatively, the determination result can be information indicative of an RFID tag 100 having been moved out of the RFID tag-reading area. Note here that the information indicative of the RFID tag 100 is for example identification information of the RFID tag 100. That is, the determination result outputted from the output section 104 can be identification information of an RFID tag 100 which has been determined by the movement determining section 103 to have been moved out of the RFID tag-reading area. Note here that the output section 104 outputs the determination result, for example, by (i) displaying the determination result on a display screen, (ii) transmitting the determination result to an external device, (iii) storing the determination result in a storage medium, (iv) transmitting the determination result to another processing device or another program etc., or (v) the like. The output section 104 can include or not include an output device such as a display screen and/or a printer. The output section 104 can be constituted by (a) a driver software of an output device, or (b) a driver software of an output device and the output device, for example.

Figure 2:
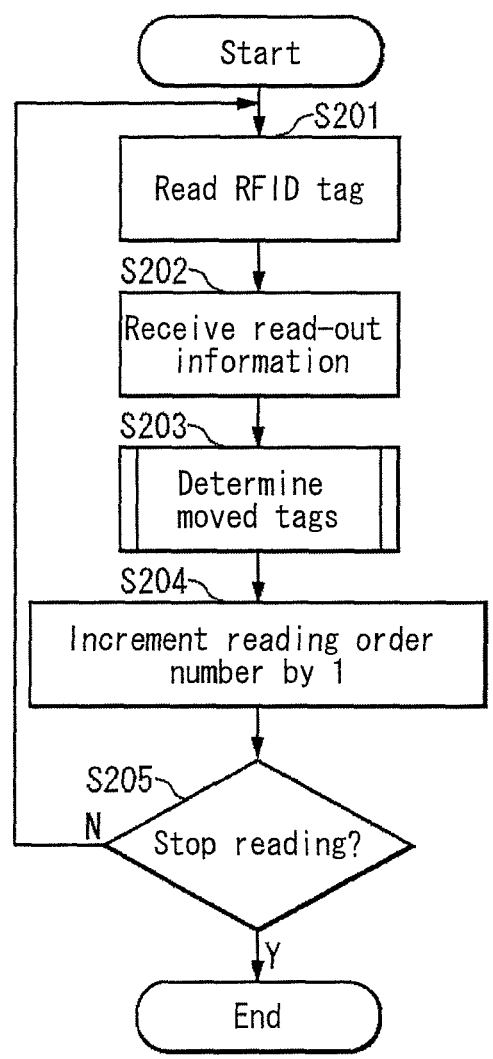
FIG. 2 is a flow diagram illustrating how the tag information processing system operates.

The following description discusses, with reference to the flow diagram of FIG. 2, how the tag information processing system operates. In the following, a description is given for a case where (i) first, the detection frequency information obtaining section 102 obtains detection frequency information, of an RFID tag 100, read in the first reading operation of the N reading operations, and then (ii) the movement determining section 103 determines, with reference to the detection frequency information read in the first reading operation of the N reading operations, whether or not the RFID tag 100 has been moved out of the RFID tag-reading area. Note that the reading operation here is carried out N times (where N is an integer equal to or greater than 2) so as to determine whether or not the RFID tag 100 has been moved out of the RFID tag-reading area. Further, the detection frequency information here is the number of times the RFID tag 100, which has been read in the first reading operation of the N reading operations, is read (detected) again in the rest of ([N−1]-times of) reading operations. Furthermore, the RFID tag 100 is determined whether or not it has been moved out of the RFID tag-reading area with reference to a threshold value M (M is an integer of not less than 1 but less than N). Alternatively, the RFID tag 100 can be determined whether or not it has been moved out of the RFID tag-reading area by comparing (a) the number of times the RFID tag 100 is detected in the N reading operations, which number counts a detection of the RFID tag 100 in the first reading operation, with (b) the threshold value which is set by taking into consideration the detection of the RFID tag 100 in the first reading operation.

(Step S201) The tag reader/writer 12 carries out, via the transmitting/receiving antenna 11, a reading operation for the RFID tag-reading area, where at least one RFID tag 100 is present. Specifically, the tag reader/writer 12 transmits, via the transmitting/receiving antenna 11, an instruction for each of at least one RFID tag 100 to transmit its information. Then, the tag reader/writer 12 receives, via the transmitting/receiving antenna 11, the information that the RFID tag 100 transmitted in response to the instruction. The information obtained here is for example identification information of the RFID tag 100.

(Step S202) The receiving section 101 receives the information, i.e., read-out information, which has been read out in Step S201 by the tag reader/writer 12. The read-out information for example includes identification information of at least one RFID tag 100. Note that identification information, which identifies an RFID tag 100, is hereinafter referred to as a tag ID. Then, the read-out information, which has been received by the receiving section 101 in the first reading operation of the N reading operations, is temporally stored as "read-out information 1" (1 is the number which indicates how many reading operations have been carried out so far including the first reading operation) in a storage medium such as a memory (not illustrated). Note here that "the number which indicates how many reading operations have been carried out so far including the first reading operation" is hereinafter referred to as a "reading order number".

(Step S203) The tag information processing apparatus 10 determines, with reference to the read-out information received in Step S202, whether or not the RFID tag 100 has been moved out of the RFID tag-reading area. Note here that an RFID tag 100 which has been moved out of the RFID tag-reading area is hereinafter referred to as a moved tag. The determination of the moved tag is described later in detail.

(Step S204) The tag information processing apparatus 10 increments, by 1, the reading order number of each read-out information which is temporarily stored, in Step S202, to the storage medium such as a memory (not illustrated). In this way, for example, the read-out information having the reading order number 1 will have a reading order number 2, while read-out information having a reading order number (N–1) will have a reading order number N. That is, according to this flow diagram, the read-out information read earlier has the larger reading order number. Note here that the reading order number does not have to be actually provided for each read-out information, as long as it is possible to know how many reading operations have been carried out including the one in which the read-out information was read. For example, the following arrangement is also possible. That is, the storage medium used is a ring buffer, which is capable of storing the read-out information obtained through the N reading operations. Then, in this ring buffer, the read-out information arranged in order of time are shifted every time new read-out information is stored, in Step S203, to the ring buffer.

(Step S205) The tag information processing apparatus 10 determines whether or not to stop reading an RFID tag 100. For example, the tag information processing apparatus 10 determines, when a stop instruction receiving section (not illustrated) etc. receives a stop instruction or the like, whether or not to stop reading an RFID tag. Then, if the tag information processing apparatus 10 determines to stop reading an RFID tag, then the reading operation is stopped. On the other hand, if the tag information processing apparatus 10 determines not to stop reading an RFID tag, then the operation returns to Step S201.

It should be noted that, if the flow diagram of FIG. 2 is used to explain only the operations of the tag information processing apparatus 10 (instead of explaining the operations of the whole tag information processing system), then Step 201, i.e., the tag reading process, can be omitted.

Figure 3:
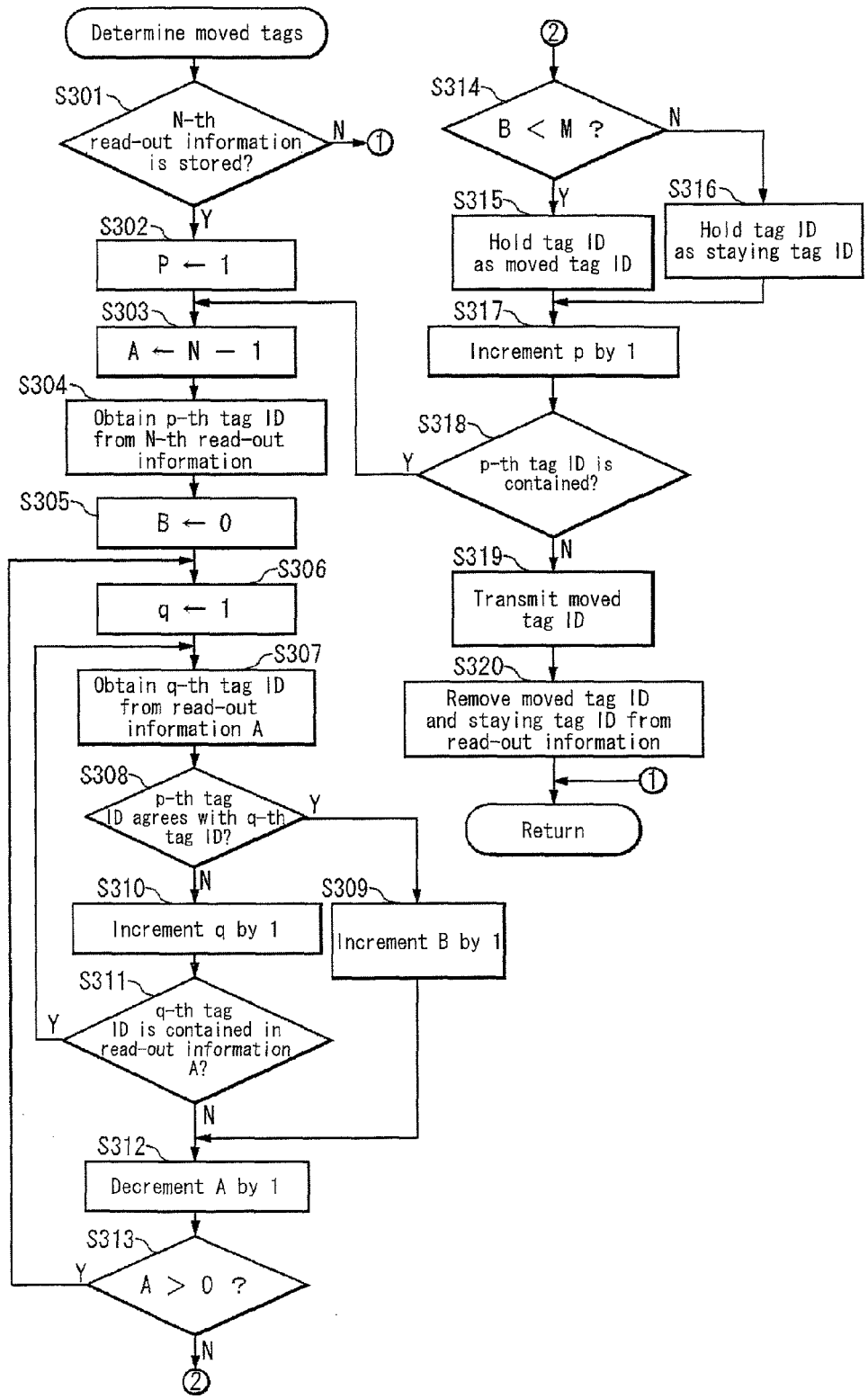
FIG. 3 is a flow diagram illustrating how the tag information processing system carries out determinations.

In the following, a detailed description is given for the determination in Step S203 shown in the flow diagram of FIG. 2, with reference to the flow diagram of FIG. 3.

(Step S301) The detection frequency information obtaining section 102 determines whether or not the read-out information having a reading order number N (this read-out information is hereinafter referred to as read-out information N) is stored in the storage medium (not illustrated) in which the read-out information is to be temporarily stored. In other words, the detection frequency information obtaining section 102 determines whether or not the read-out information obtained through the sequentially-performed N reading operations are stored in the storage medium. If the read-out information N is stored, then the operation proceeds to Step S302. If not, then the operation returns to the main flow of the operation.

(Step S302) The detection frequency information obtaining section 102 assigns 1 to a counter p.

(Step S303) The detection frequency information obtaining section 102 assigns (N–1) to a counter A.

(Step S304) The detection frequency information obtaining section 102 obtains a tag ID of a p-th RFID tag from the read-out information N.

(Step S305) The detection frequency information obtaining section 102 assigns 0 to a counter B. The counter B counts how many times the tag ID, which was obtained in Step S304, is detected in the first reading operation through the (N–1)-th reading operation. Note that in a case of counting how many times the tag ID is detected in the first reading operation through the N-th reading operation, the detection frequency information obtaining section 102 should assign 1 to the counter B in this step. If this is the case, (i) the threshold value M should be incremented by 1, or (ii) the counter B should be determined whether or not it is equal to or less than the threshold value M in the later-described Step S314.

(Step S306) The detection frequency information obtaining section 102 assigns 1 to a counter q.

(Step S307) The detection frequency information obtaining section 102 obtains a q-th tag ID from read-out information A.

(Step S308) The detection frequency information obtaining section 102 compares the p-th tag ID obtained from the read-out information N in Step 304 with the q-th tag ID obtained from the read-out information A in Step S307. In this way, the detection frequency information obtaining section 102 determines whether or not the p-th tag ID agrees with the q-th tag ID. If the p-th tag ID agrees with the q-th tag ID, then the operation proceeds to Step S309. If the p-th tag ID does not agree with the q-th tag ID, then the operation proceeds to Step S310.

(Step S309) The detection frequency information obtaining section 102 increments the value of the counter B by 1. Then, the operation proceeds to Step S312.

(Step S310) The detection frequency information obtaining section 102 increments the value of the counter q by 1. Then, the operation proceeds to Step S311.

(Step S311) The detection frequency information obtaining section 102 determines whether or not the read-out information A contains the q-th tag ID. If the read-out information A contains the q-th tag ID, then the operation returns to Step S307. If not, then the operation proceeds to Step S312.

(Step S312) The detection frequency information obtaining section 102 decrements the value of the counter A by 1.

(Step S313) The detection frequency information obtaining section 102 determines whether or not the value of the counter A is greater than 0. If the value is greater than 0, then the operation returns to Step S306. If the value is not greater than 0, then the operation proceeds to Step S314. The value of the counter B obtained at this point serves as the detection frequency information of an RFID tag 100 which corresponds to the tag ID obtained in Step S304.

(Step S314) The movement determining section 103 determines whether or not the value of the counter B is less than the threshold value M. If the value of the counter B is less than the threshold value M, then the operation proceeds to Step S315. If the value of the counter B is not less than the threshold value M, then the operation proceeds to Step S316.

(Step S315) The movement determining section 103 determines that the tag ID obtained in Step 304 is that of a moved tag moved out of the RFID tag-reading area. Then, the movement determining section 103 holds the tag ID as a moved tag ID, which is identification information of a moved tag. Thereafter, the operation proceeds to Step S317.

(Step S316) The movement determining section 103 determines that the tag ID obtained in Step S304 is that of a tag staying within the RFID tag-reading area (this tag is hereinafter referred to as a staying tag). Then, the movement determining section 103 holds this tag ID as a staying tag ID, which is identification information of a staying tag. Thereafter, the operation proceeds to Step S317.

(Step S317) The detection frequency information obtaining section 102 increments the value of the counter p by 1.

(Step S318) The detection frequency information obtaining section 102 determines whether or not the read-out information N contains the p-th tag ID. If the read-out information N contains the p-th tag ID, then the operation returns to Step S303. If not, the operation proceeds to Step S319.

(Step S319) The output section 104 outputs the moved tag ID obtained in Step S315. For example, the output section 104 transmits the moved tag ID to an external database or the like. Note here that the output section 104 can output the staying tag ID obtained in Step S316, instead of the moved tag ID. Further, the output section 104 can output both the moved tag ID and the staying tag ID in such a manner that the moved tag ID and the staying tag ID can be distinguished from each other.

(Step S320) The detection frequency information obtaining section 102 removes, from the read-out information stored in the storage medium (not illustrated), a tag ID which agrees with the moved tag ID obtained in Step S315 or with the staying tag ID obtained in Step S316. In this way, a tag ID of an RFID tag 100, for which it has already been determined whether or not the RFID tag 100 is a moved tag, is removed from the read-out information obtained through the N reading operations. This makes it unnecessary for the detection frequency information obtaining section 102 and the movement determining section 103 to further determine the already-determined tag ID in subsequent (N−1) determinations of the moved tag. Alternatively, the following arrangement is also possible. That is, the moved tag ID and the staying tag ID are listed as tag IDs that should not be determined whether or not they are moved tags. Then, the list is referred to when a tag ID is obtained in Step S304 so as to find whether or not the tag ID is in the list. If the tag ID is in the list, then the detection frequency information obtaining section 102 does not obtain a further tag ID in a predetermined number of times or for a predetermined period of time. In this way, no further tag ID is obtained, and thus no further determination of whether or not the tag ID has been moved out of the RFID tag-reading area is carried out. As used herein, "in a predetermined number of times" and "for a predetermined period of time" refer to a fixed or variable number of times and a fixed or variable time period, respectively, which are specified in advance. Then, the operation returns to the main flow of the operation.

Figure 4:
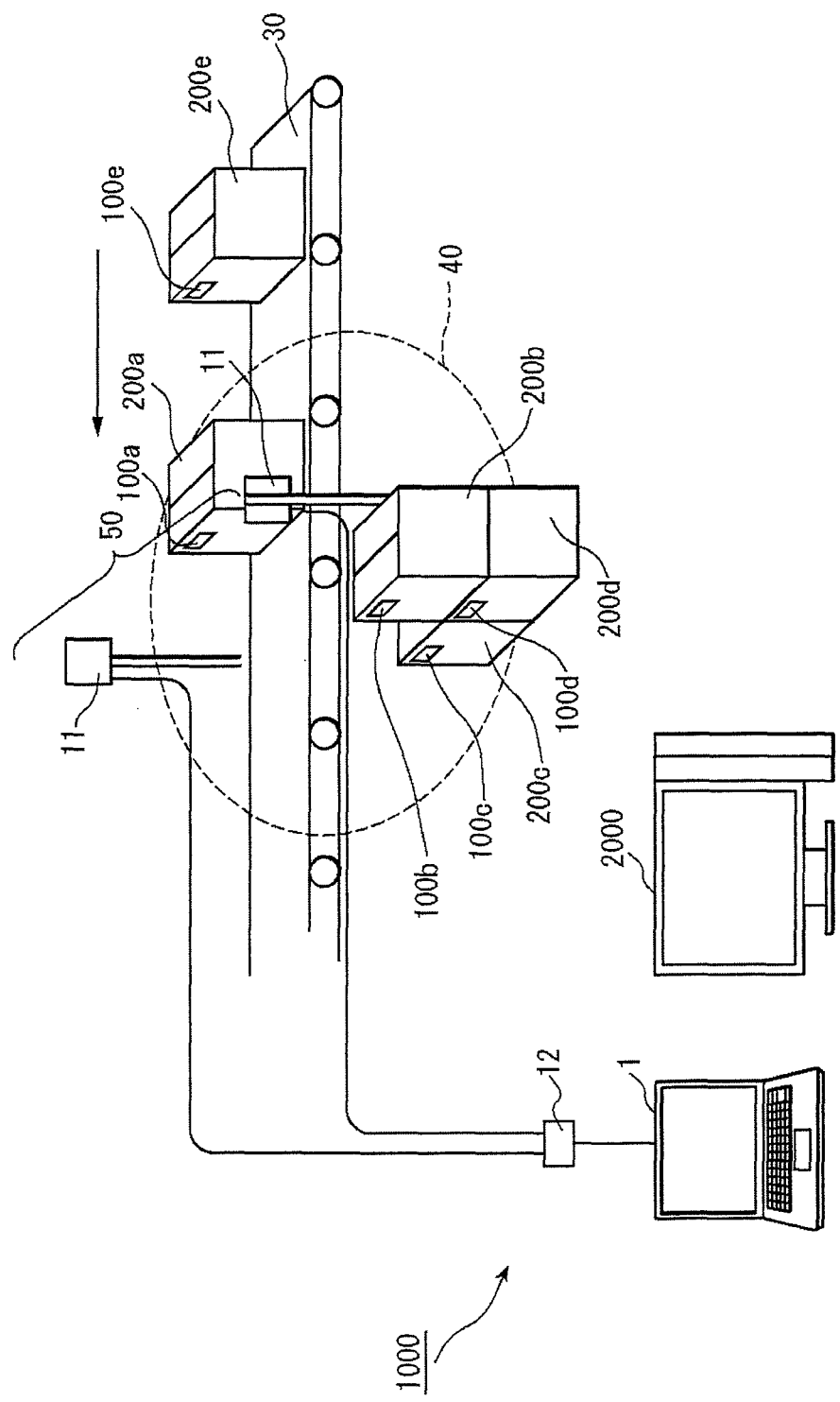
FIG. 4 is a conceptual diagram illustrating the tag information processing system.

In the following, a description is given for a specific example of how the tag information processing apparatus operates. FIG. 4 is a conceptual diagram of the tag information processing system. In this specific example, a description is given for a case where packaged products which are being moved out of a factory are managed by using a tag information processing system 1000. Packaged products 200a through 200e are respectively provided with RFID tags 100a through 100e (hereinafter may be collectively referred to as RFID tags 100), each having identification information unique thereto. The transmitting/receiving antenna 11 is provided near a gate 50 through which the products are moved out. Note here that the transmitting/receiving antenna 11 includes two antennas that are provided at both sides of the gate 50 so that parts, of the two antennas, via which radio waves are transmitted and received, face each other. The products to be moved out are moved by a belt conveyer 30 through the gate 50. The tag information processing system 1000 is connected to an information processing device 2000 over the network etc., which device includes a database for managing a moved-out RFID tag 100. Further, in this specific example, an area reached by radio waves emitted by the transmitting/receiving antenna 11 serves as an RFID tag-reading area 40. Furthermore, the RFID tags 100a through 100e have tag IDs T201 through T205 (hereinafter may be collectively referred to as tag IDs), respectively. Moreover, in this specific example, a reading operation is carried out 4 times (that is, the number N is 4), and the threshold value M is 1.

The tag reader/writer 12 of the tag information processing system 1000 repeatedly carries out, at predetermined timings, the reading operation for the RFID tag-reading area 40, where the tag IDs of the RFID tags 100 are to be read. The RFID tag-reading area 40 is positioned near the gate 50.

In a first reading operation of the repeating reading operations, the tag ID T201 is read from the RFID tag 100a of the product 200a, which is passing through the gate 50. Meanwhile, the tag IDs T202 through T204 are also read from the RFID tags 100b through 100d of the products 200b through 200d positioned in the vicinity of the gate 50, although the products 200b through 200d are not to be transported. This is because the products 200b through 200d are also present in the RFID tag-reading area 40. On the other hand, read-out information of the tag 100e of the product 200e is not read in the first reading operation, because the product 200e is positioned outside the RFID tag-reading area 40. Then, the tag IDs obtained in the first reading operation are outputted from the tag reader/writer 12, so that the outputted tag IDs, serving as read-out information, are received by the receiving section 101 of the tag information processing apparatus 10. The receiving section 101 stores, to a storage medium or the like (not illustrated), the received read-out information as read-out information having the reading order number 1.

FIG. 5 illustrates the read-out information stored by the receiving section 101. The read-out information is in a form of a list that contains the tag IDs read from the RFID tags 200a through 200d. The reading order number of the read-out information is "1", and thus the read-out information is referred to as "read-out information 1". In the present embodiment, read-out information S (S is an integer) is read-out information obtained in a S-th reading operation. The number "S" as in the "read-out information S" can be regarded, in a case where the latest reading operation is numbered as "1", as a number which indicates how many reading operations have been carried out so far since the read-out information S was obtained (including the reading operation in which the read-out information S was obtained).

The detection frequency information obtaining section 102 determines whether or not the read-out information N is stored in the storage medium such as a memory (not illustrated) in which the read-out information is to be stored. In this example, the storage medium stores only the read-out information 1. Therefore, the tag information processing apparatus 10 does not determine whether or not an RFID tag has been moved (this operation is hereinafter referred to as a determination of moved tags). Then, the tag information processing apparatus 10 increments, by 1, the reading order number of the read-out information stored in the storage medium. In this way, the read-out information 1 becomes read-out information 2.

Next, the tag reader/writer 12 carries out a second reading operation. Note here that the product 200a has been moved by the belt conveyer 30 out of the RFID tag-reading area 40, whereas the product 200e has been moved by the belt conveyer 30 into the RFID tag-reading area 40. Then, the tag reader/writer 12 reads the tag IDs of the RFID tags 100a and 200e. Assume here that the tag ID of the RFID tag 100c was not read due to a poor reception condition of radio waves.

The receiving section 101 receives read-out information, which are tag IDs obtained by the tag reader/writer 12. Then, the receiving section 101 stores the read-out information to the storage medium or the like (not illustrated) as read-out information having the reading order number 1, in the same manner as above.

FIG. 6 illustrates the read-out information, obtained through the 2 reading operations, which are stored by the receiving section 101.

The detection frequency information obtaining section 102 determines whether or not the read-out information N is stored in the storage medium such as a memory (not illustrated) in which the read-out information is to be stored. In this example, the storage medium stores only the read-out information 1 and the read-out information 2. Therefore, the tag information processing apparatus 10 does not carry out the determination of moved tags. Then, the tag information processing apparatus 10 increments, by 1, the reading order number of each of the read-out information 1 and the read-out information 2 which are stored in the storage medium. In this way, the read-out information 1 becomes read-out information 2, while the read-out information 2 becomes read-out information 3.

The reading operation as above is further repeated.

The following description discusses a state where the reading operation has been carried out N times, and the read-out information obtained through the N reading operations have been stored in the storage medium by the receiving section 101.

FIG. 7 illustrates the read-out information stored by the receiving section 101. The read-out information N in FIG. 7 is the one obtained in the earliest reading operation of the N reading operations. On the other hand, the read-out information 1 is the one obtained in the last reading operation of the N reading operations.

The detection frequency information obtaining section 102 determines whether or not the read-out information N is stored in the storage medium such as a memory (not illustrated) in which the read-out information is to be stored. In this example, the read-out information N is stored in the storage medium. Therefore, the tag information processing apparatus 10 carries out the determination of moved tags.

First, the detection frequency information obtaining section 102 obtains one of tag IDs in the read-out information N. Note here that the detection frequency information obtaining section 102 obtains the uppermost tag ID "T201" in the read-out information N.

Next, the detection frequency information obtaining section 102 compares the uppermost tag ID "T201" in the read-out information N with each of tag IDs in the read-out information (N−1) obtained in a subsequent reading operation, so as to determine whether or not the tag ID "T201" agrees with any of the tag IDs in the read-out information (N−1). If the tag ID "T201" agrees with any of the tag IDs in the read-out information (N−1), then the number of tag IDs which agree with the tag ID "T201" is counted. In the read-out information (N−1), there is no tag ID that agrees with the tag ID "T201". Therefore, the count is not carried out. Next, the detection frequency information obtaining section 102 compares the tag ID "T201" with each of tag IDs in the read-out information (N−2), in the same manner as above, so as to determine whether or not the tag ID "T201" agrees with any of the tag IDs in the read-out information (N−2). Also in the read-out information (N−2), there is no tag ID which agrees with the tag ID "T201". Therefore, the count is not carried out.

This comparison with the tag ID "T201" is repeatedly carried out sequentially until the comparison is carried out for the read-out information 1. In this example, the tag ID "T201" is not contained in any of the read-out information 1 through (N−1). Therefore, the number of tag IDs which agree with the tag ID "T201" is "0".

Next, the number of tag IDs which agree with the uppermost tag ID "T201" in the read-out information N is compared with the threshold value M. In this example, the number of tag IDs which agree with the tag ID "T201" is "0", which is less than the threshold value M (=1). This satisfies a condition based on which to determine that a tag ID is that of a moved tag, which condition is such that "the value of the detection frequency information (the number of tag IDs which agree with the tag ID "T201") is less than the threshold value M". Accordingly, the tag ID "T201" is determined to have been moved out of the RFID tag-reading area 40. The tag ID "T201" is temporarily stored, as a moved tag ID, in the storage medium such as a memory (not illustrated).

Next, the detection frequency information obtaining section obtains the second uppermost tag ID "T202" in the read-out information N.

Then, the detection frequency information obtaining section 102 compares the second uppermost tag ID "T202" in the read-out information N with each of tag IDs in the read-out information (N−1) obtained in the subsequent reading operation, so as to determine whether or not the tag ID "T202" agrees with any of the tag IDs in the read-out information (N−1). If the tag ID "T202" agrees with any of the tag IDs in the read-out information (N−1), then the number of tag IDs which agree with the tag ID "T202" is counted. In this example, the uppermost tag ID in the read-out information (N−1) agrees with the tag ID "T202". Therefore, the uppermost tag ID in the read-out information (N−1) is counted. If the count is carried out here, the detection frequency information obtaining section 102 compares the tag ID "T202" with each of tag IDs in the read-out information (N−2), in the same manner as above, so as to determine whether or not the tag ID "T202" agrees with any of the tag IDs in the read-out information (N−2). Also in the read-out information (N−2), there is a tag ID which agrees with the tag ID "T202". Therefore, this tag ID in the read-out information (N−2) is counted.

This comparison with the tag ID "T202" is repeatedly carried out sequentially until the comparison is carried out for the read-out information 1, in the same manner as above. In this example, the tag ID "T202" is contained in each of the read-out information 1 through (N−1). Therefore, the number of tag IDs which agree with the tag ID "T202" is "N−1".

Next, the movement determining section 103 compares the number of tag IDs which agree with the second uppermost tag ID "T202" in the read-out information N with the threshold value M. In this example, the number of tag IDs which agree with the tag ID "T202" is "N−1", which is greater than the threshold value M (=1). Accordingly, the tag ID "T202" is determined to be staying within the RFID tag-reading area 40. Then, the tag ID "T202" is temporarily stored, as a staying tag ID, to the storage medium such as a memory (not illustrated).

Then, the detection frequency information obtaining section 102 obtains the third uppermost tag ID "T203" in the read-out information N.

The detection frequency information obtaining section 102 compares the third uppermost tag ID "T203" in the read-out information N with each of tag IDs in the read-out information (N−1) obtained in the subsequent reading operation, so as to determine whether or not the tag ID "T203" agrees with any of the tag IDs in the read-out information (N−1). If the tag ID "T203" agrees with any of the tag IDs in the read-out information (N−1), then the number of tag IDs which agree with the tag ID "T203" is counted. In this example, the tag ID "T203" does not agree with the uppermost tag ID in the read-out information (N−1). Therefore, the count is not carried out. Further, the detection frequency information obtaining section 102 compares the tag ID "T203" with each of tag IDs in the read-out information (N−2), in the same manner as above, so as to determine whether or not the tag ID "T203" agrees with any of the tag IDs in the read-out information (N−2). Also in the read-out information (N−2), there is no tag ID which agrees with the tag ID "T203". Therefore, the count is not carried out.

This comparison with the tag ID "T203" is repeatedly carried out sequentially until the comparison is carried out for the read-out information 1. In this example, the tag ID "T203" read out from the RFID tag 100c is contained only in the read-out information 1, because of the poor reception condition of radio waves. Therefore, the number of tag IDs which agree with the tag ID "T203" is "1".

Next, the movement determining section 103 compares (i) the number of tag IDs which agree with the third uppermost tag ID "T203" in the read-out information N with (ii) the threshold value M. In this example, the number of tag IDs which agree with the tag ID "T203" is "1", which is equal to the threshold value M (=1). That is, the number of tag IDs which agree with the tag ID "T203" is not less than the threshold value M. Therefore, the tag ID "T203" is determined to be staying within the RFID tag-reading area 40. The tag ID "T203" is temporarily stored, as a moved tag ID, in the storage medium such as a memory (not illustrated). As so far described, each of the RFID tags 100 (i.e., RFID tags 100a through 100e) is determined whether or not it is a staying tag, based on the determination of whether or not the number of times the tag ID of each of the RFID tags 100 is detected in the read-out information obtained through the N reading operations is less than the threshold value M. Accordingly, it is possible to appropriately determine whether or not each of the RFID tags 100 is a staying tag, even in a case where the RFID tag 100 cannot be properly read due to the poor reception condition of radio waves, a disturbance, another material blocking radio waves from reaching the RFID tag 100, or the like. This is because the determination is carried out by taking into consideration a successful reading rate of an RFID tag. For example, assume that N=5 and M=1. Even in a case where a tag ID read in the first reading operation was read only once in the second through fifth reading operations due to the poor reception condition of radio waves etc., it is still possible to determine that the RFID tag 100 having this tag ID is a staying tag.

The operation above is repeated until the operation is carried out for the fourth uppermost tag ID "T204" in the read-out information N. That is, the operation is repeated until there is no more new tag ID in the read-out information N. Then, the detection frequency information obtaining section 102 stops obtaining a tag ID from the read-out information N.

FIG. 8 is a tag ID management table, for managing tag IDs of moved tags and staying tags, which is stored in a memory etc. (not illustrated). The tag ID management table has an "ID" column and an "Tag Attribute" column. The "ID" column lists tag IDs. The "Tag Attribute" column lists values each of which indicates whether a corresponding RFID tag is a moved tag or a staying tag.

Next, the output section 104 transmits, to an information processing device 2000, a moved tag ID stored in the memory etc. Specifically, the output section 104 transmits, to the information processing device 2000, a tag ID whose corresponding value listed in the "Tag Attribute" column of the tag ID management table of FIG. 8 is "Moved Tag". Alternatively, the output section 104 can transmit a tag ID whose corresponding value listed in the "Tag Attribute" column is "Staying Tag". Which one of those tag IDs is to be transmitted, or both of those tag IDs are to be transmitted, can be determined depending on an intended use.

Next, the detection frequency information obtaining section 102 removes, from the read-out information obtained through the N reading operations (see FIG. 7), the tag IDs "T201" through "T204". That is, the tag IDs, for which their corresponding RFID tags have been determined to be a moved tag or a staying tag (see FIG. 8), are removed from the read-out information obtained through the N reading operations. Then, the determination of moved tags is completed.

Thereafter, the reading order number of each of the read-out information stored in the storage medium or the like (not illustrated) is incremented by 1. Then, the tag reader/writer 12 again carries out reading of the RFID tags 100. Thereafter, the receiving section 101 stores, as read-out information 1, the obtained tag IDs in the storage medium etc. (not illustrated). Note here that, even in a case where no tag ID was obtained in the reading, the receiving section 101 still stores the read-out information 1 containing no tag ID. Then, the determination of moved tags is carried out with reference to the read-out information 1 through N obtained through the N reading operations, in the same manner as above. In this second determination of moved tags, the read-out information N contains a tag ID "T205" of the RFID tag 100e. Therefore, the tag ID "T205" is determined whether or not it is a moved tag.

In this way, the reading operation for the RFID tags 100, the determination of moved tags, and the like are repeatedly carried out.

A user can selectively manage only the products having been moved out (that is, products other than the products staying within the RFID tag-reading area 40) with reference to moved tag IDs received by the information processing device 2000.

Alternatively, a user can selectively manage only the products staying within the RFID tag-reading area 40 with reference to the staying tag IDs, by causing the output section 104 to output staying tag IDs.

The following description discusses accuracy of the determination, of moved tags, carried out by using the tag information processing system 1000.

A probability P (p), of an event that has an occurrence probability p occurring M or more times in N times, is found through the following equation, which is a binomial probability density function:

$$P(p) = \sum_{m=M}^{N} b(m; N, p) \qquad \text{Equation 1}$$

where, $$b(m; N, p) = \binom{N}{m} p^m (1-p)^{N-m}$$

$$\binom{N}{m} = {}_N C_m$$

Further, a probability P (p) of the event occurring less than M times in N times is found through the following equation:

$$P(p) = \sum_{m=0}^{M-1} b(m; N, p) \qquad \text{Equation 2}$$

The probability of the event occurring M or more times is a sum of probabilities of cases where m=M, m=M+1, m=M+2, ... and m=N. On the other hand, the probability of the event occurring less than M times is a sum of probabilities of cases where m=M−1, m=M−2, ... and m=0.

Figure 9:
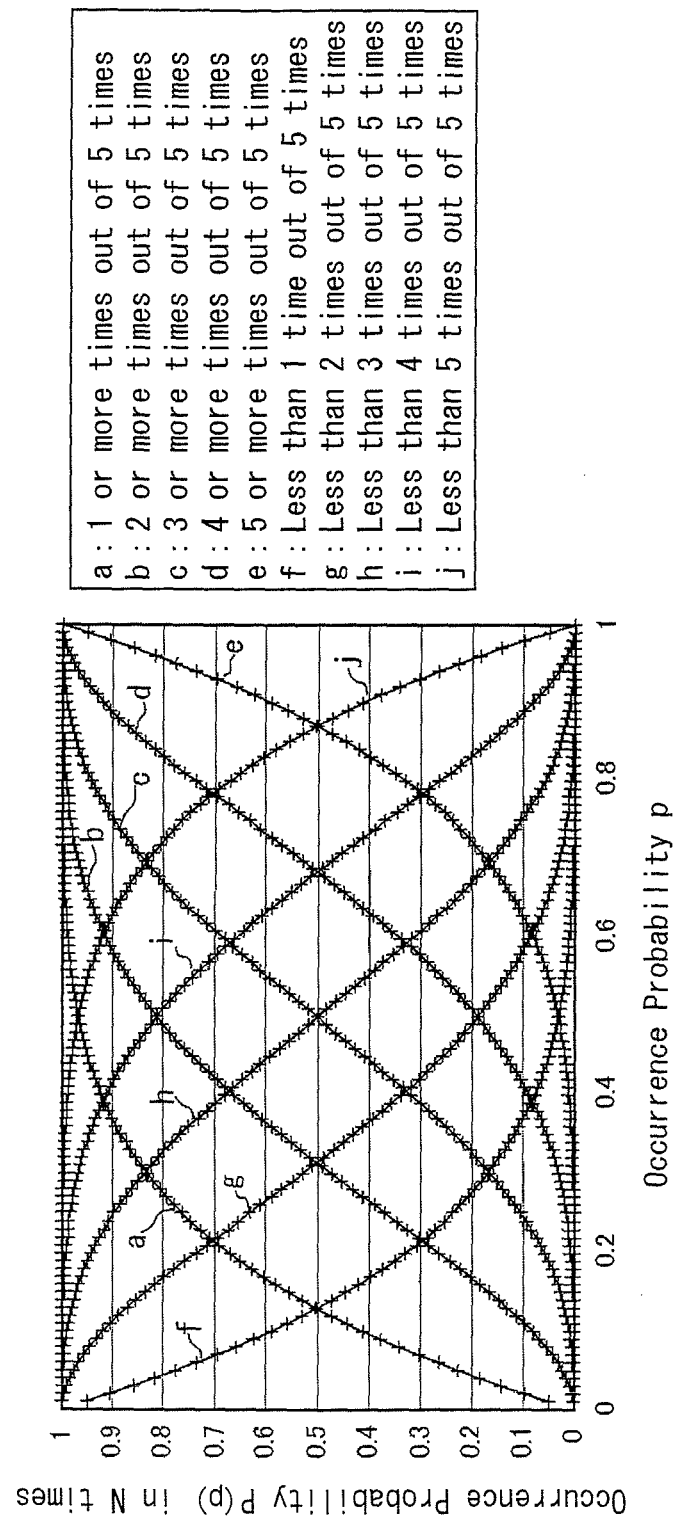
FIG. 9 is a graph describing the effect of the tag information processing system.

In the following, the determination of moved tags in accordance with the present invention is explained with use of Equations 1 and 2. FIG. 9 is a graph which plots (i) a probability of the event that has an occurrence probability p occurring M or more times in the N reading operations, and (ii) a probability of the event that has an occurrence probability p occurring less than M times in the N reading operations. In the graph, a horizontal axis indicates an occurrence probability p, whereas a vertical axis indicates a probability P (p) of the event occurring in the N reading operations.

Note however that the N in Equations 1 and 2 is less, by 1, than the N described earlier in the embodiments or the like. The reason therefor is as follows. The N in Equations 1 and 2 is that of a case where a tag ID of an RFID tag 100 which is already present in the RFID tag-reading area is already known. Therefore, the first reading operation, which is for reading the tag ID of the RFID tag 100 already present in the RFID tag-reading area, is not taken into consideration. In other words, the probability of the event occurring in the N reading operations here means a probability of a tag ID, which agrees with the tag ID read in the first reading operation of the (N+1) reading operations (N is an integer equal to or greater than 1), being detected in the rest of (N−times of) the reading operations. This applies also to the descriptions for FIGS. 11 and 12.

In FIG. 9, assume that the occurrence probability p denotes a successful reading rate of an RFID tag 100 present in the RFID tag-reading area. In a case of a staying tag having a successful reading rate of approximately 60%, a rate of the staying tag being erroneously determined to be a moved tag (this rate is hereinafter referred to as an erroneous reading rate) can be reduced to approximately 1% by controlling the value of M.

Further, in order to determine whether an RFID tag 100 is a moved tag or a staying tag, the RFID tag 100 must be within the RFID tag-reading area (communication area). Accordingly, a final erroneous reading rate is represented by p×P (p).

Figure 10:
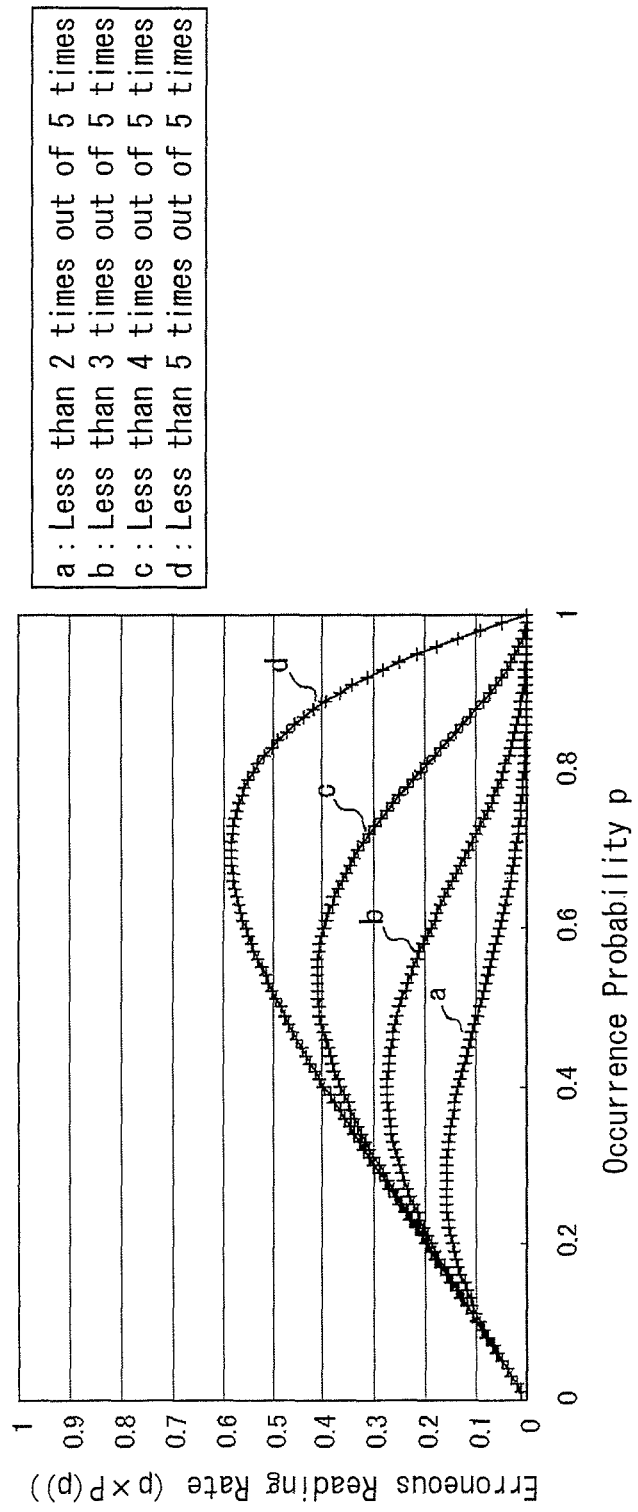
FIG. 10 is another graph describing the effect of the tag information processing system.

FIG. 10 shows a theoretical value of the erroneous reading rate, i.e., a rate at which a staying tag is erroneously determined to be a moved tag. The theoretical value is obtained in a case where a tag ID, which was read in the first reading operation and failed to be read in a predetermined number of reading operations of the subsequent 5 reading operations, is added to a database. That is, FIG. 10 is a graph which illustrates the theoretical value of the erroneous reading rate, which is obtained in a case where a moved tag ID is defined as only a tag ID that has once been read and then read only less than a predetermined number of times in the subsequent 5 reading operations. In FIG. 10, the theoretical value is shown for each predetermined number of times, and a horizontal axis and a vertical axis respectively indicate a successful reading rate of an RFID tag 100 in the RFID tag-reading area and the erroneous reading rate (i.e., p×(P)(p)) of a staying tag.

Figure 11:
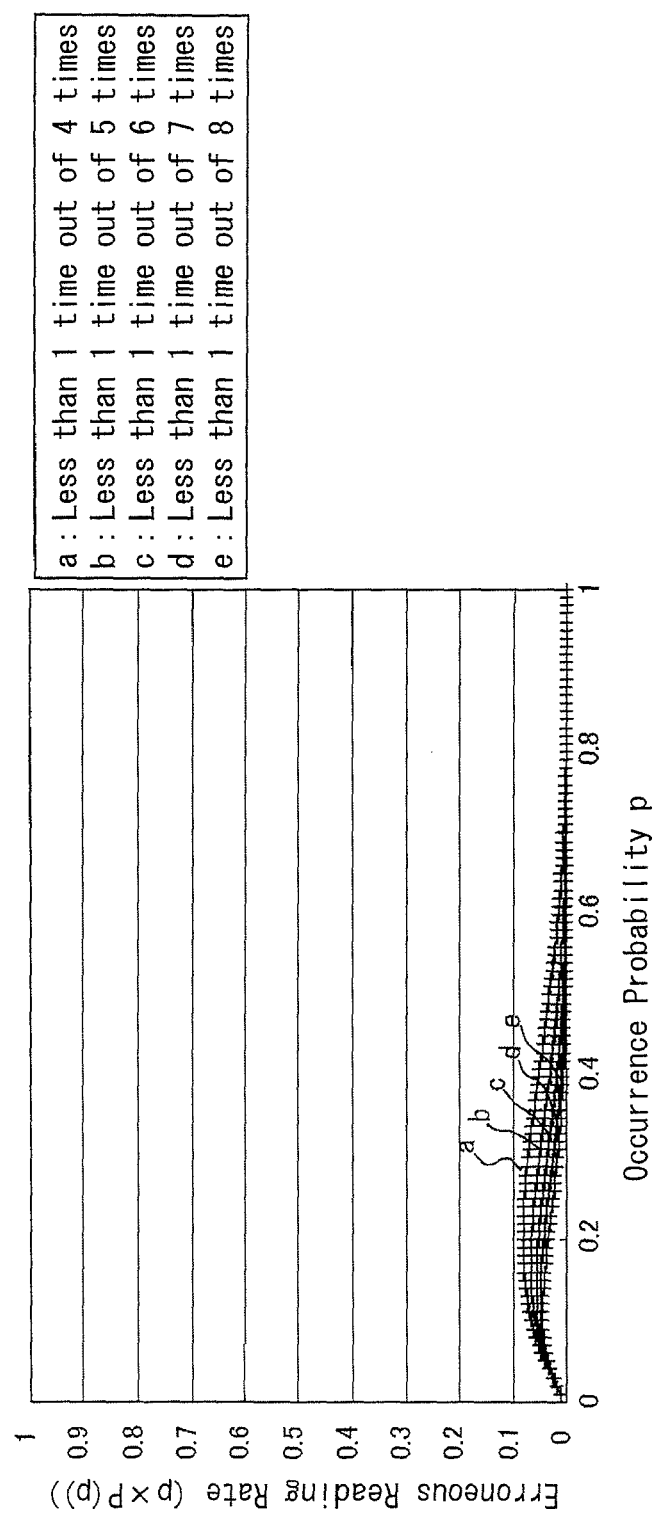
FIG. 11 is still another graph describing the effect of the tag information processing system.

FIG. 11 illustrates a theoretical value of an erroneous reading rate of a staying tag, where M is 1 and N is a variable which takes values of 4, 5, 6, 7, and 8.

FIGS. 10 and 11 show that, in a case where N=5, the erroneous reading rate can be reduced up to approximately 8% by adding, to the database, a tag ID which has never been successfully read in the 5 reading operations. Actually, a threshold value (i.e., the predetermined number of times) is preferably set to less than 1 so as to improve accuracy. That is, it is preferable to define the moved tag as being an RFID tag having a tag ID which was detected only in the first reading operation of the 6 reading operations and was not detected in the subsequent 5 reading operations.

Further, as illustrated in FIG. 11, the erroneous reading rate can be reduced by controlling values of N and M. Note however that, as the value of N increases, more time is required for the determination of moved tags. Therefore, the values of N and M are preferably set by taking into consideration (i) an actual time period during which an RFID tag that is being moved is present within the communication area, (ii) polling intervals, and (iii) the like.

As so far described, according to the present embodiment, an RFID tag is determined, with reference to the detection frequency of the tag ID, whether or not it has been moved out of the RFID tag-reading area. The tag ID serves as read-out information of the RFID tag, and is obtained through the N reading operations carried out for the RFID tag-reading area. Accordingly, it is possible to determine whether or not the RFID tag has been moved out of the RFID tag-reading area, while taking into consideration the successful reading rate of the RFID tag. As such, it is possible to accurately determine whether or not the RFID tag has been moved out of the RFID tag-reading area, or whether or not the RFID tag is staying within the RFID tag-reading area.

As a result, a user is able to selectively manage moved tags or selectively manage staying tags.

Further, according to the present embodiment, a detection frequency, of a tag ID, which serves as read-out information of an RFID tag and is obtained through the N reading operations for the RFID tag-reading area, is compared with a threshold value that has been prepared in advance. Then, the RFID tag corresponding to the tag ID is determined, based on a result of the comparison, whether or not the RFID tag has been moved out of the RFID tag-reading area. Accordingly, it is possible to more accurately determine whether or not the RFID tag has been moved out of the RFID tag-reading area, by setting the threshold value by taking into consideration the successful reading rate of the RFID tag.

Embodiment 2

A tag information processing system in accordance with the present embodiment makes it possible to estimate a direction (hereinafter may be referred to as a movement direction) in which an RFID tag is being moved, by making use of the configuration of the tag information processing system described in Embodiment 1.

Figure 12:
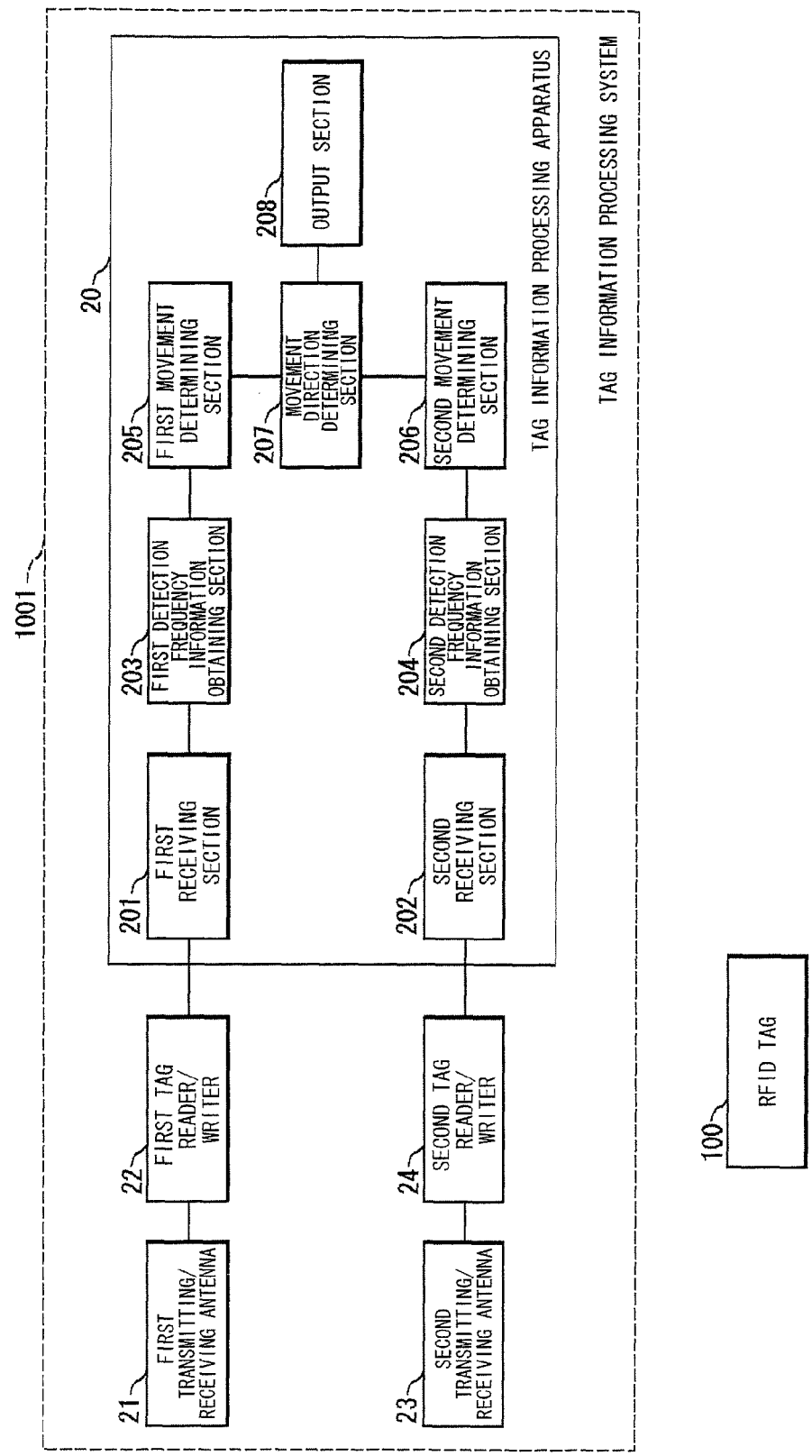
FIG. 12 is a block diagram illustrating a tag information processing system of Embodiment 2 of the present invention.

FIG. 12 is a block diagram illustrating a configuration of a tag information processing system in accordance with the present embodiment. A tag information processing system 1001 includes a tag information processing apparatus 20, a first transmitting/receiving antenna 21, a first tag reader/writer 22, a second transmitting/receiving antenna 23, and a second tag reader/writer 24. Note that the tag information processing system 1001 deals with at least one RFID tag 100, as is the case with Embodiment 1.

The tag information processing apparatus 20 includes a first receiving section 201, a second receiving section 202, a first detection frequency information obtaining section 203, a second detection frequency information obtaining section 204, a first movement determining section 205, a second movement determining section 206, a movement direction determining section 207, and an output section 208.

The first transmitting/receiving antenna 21 and the first tag reader/writer 22 carry out a reading operation for a first area, where an RFID tag 100 is to be read, in the same manner as the transmitting/receiving antenna 11 and the tag reader/writer 12 described in Embodiment 1. Therefore, descriptions for configurations and operations of the first transmitting/receiving antenna 21 and the first tag reader/writer 22 are omitted here. The first area is a first RFID tag-reading area, where an RFID tag 100 is to be read. Note in the present embodiment that the number of times the first tag reader/writer 22 carries out the reading operation is represented by N (N is an integer equal to or greater than 2).

The second transmitting/receiving antenna 23 and the second tag reader/writer 24 carry out a reading operation for a second area, where an RFID tag 100 is to be read. The second area does not overlap the first area. That is, the second transmitting/receiving antenna 23 and the second tag reader/writer 24 are same as the transmitting/receiving antenna 11 and the tag reader/writer 12 described in Embodiment 1, except that an area for which the reading operation is carried out is different. Therefore, descriptions for configurations and operations of the second transmitting/receiving antenna 23 and the second tag reader/writer 24 are omitted here. The second area is a second RFID tag-reading area where an RFID tag is to be read, and does not overlap the first area as described earlier. Note in the present embodiment that the number of times the second tag reader/writer 24 carries out the reading operation is represented by L (L is an integer equal to or greater than 2). The values of L and N can be an identical value, or can be different values.

The first receiving section 201 receives first read-out information, serving as information of an RFID tag 100, which is read by the first tag reader/writer 22. Next, the first detection frequency information obtaining section 203 obtains, with reference to the first read-out information, first detection frequency information indicative of a detection frequency at which information of the RFID tag 100 is detected in the N reading operations. Then, the first movement determining section 205 determines, in a case where the first detection frequency information indicates that the detection frequency at which the RFID tag 100 is detected is low, that the RFID tag 100 has been moved out of the first area. Note that the first receiving section 201, the first detection frequency information obtaining section 203, and the first movement determining section 205 have the same configurations and operate in the same manner as the receiving section 101, the detection frequency information obtaining section 102, and the movement determining section 103 of Embodiment 1, respectively. Therefore, descriptions for these sections are omitted here.

The second receiving section 202 receives second read-out information, serving as information of an RFID tag 100, which is read by the second tag reader/writer 24. Next, the second detection frequency information obtaining section 204 obtains, with reference to the second read-out information, second detection frequency information indicative of a detection frequency at which information of the RFID tag 100 is detected in the L reading operations. Then, the second movement determining section 206 determines, in a case where the second detection frequency information indicates that the detection frequency at which the RFID tag 100 is detected is low, that the RFID tag 100 has been moved out of the second area. Note that the second receiving section 202, the second detection frequency information obtaining section 204, and the second movement determining section 206 have the same configurations and operate in the same manner as the receiving section 101, detection frequency information obtaining section 102, and the movement determining section 103 of Embodiment 1, respectively. Therefore, descriptions for these sections are omitted here.

The movement direction determining section 207 determines, on the basis of the determinations made by the first movement determining section 205 and the second movement determining section 206, a direction in which the RFID tag 100 is being moved. Specifically, the movement direction determining section 207 determines the direction in which the RFID tag 100 is being moved, on the basis of a combination of (i) the determination, made by the first movement determining section 205, which indicates that the RFID tag 100 has been moved out of the first area and (ii) the determination, made by the second movement determining section 206, which indicates that the RFID tag 100 has been moved out of the second area. For example, the movement direction determining section 207 determines that the RFID tag 100 has been moved in a direction from the first area towards the second area via the first area and the second area, in a case where (iii) the first movement determining section 205 determines that the RFID tag 100 has been moved out of the first area, and then (iv) the second movement determining section 206 determines, within a fixed or variable predetermined time period from the determination made by the first movement determining section 205, that the RFID tag 100 has been moved out of the second area. Further, for example, the movement direction determining section 207 determines that the RFID tag 100 has been moved in a direction from the second area towards the first area via the second area and the first area, in a case where (v) the second movement determining section 206 determines that the RFID tag 100 has been moved out of the second area, and then (vi) the first movement determining section 205 determines, within a predetermined time period from the determination made by the second movement determining section 206, that the RFID tag 100 has been moved out of the first area. Furthermore, the movement direction determining section 207 can determine that the RFID tag 100 has been moved out of the first area but is not in the second area, in a case where (vii) the first movement determining section 205 determines that the RFID tag 100 has been moved out of the first area, and then (viii) the second movement determining section 206, within a fixed or variable predetermined time period from the determination made by the first movement determining section 205, does not determine that the RFID tag has been moved out of the second area and determines that the RFID tag is not staying within the second area. Moreover, the movement direction determining section 207 can determine that the RFID tag 100 has been moved out of the second area but is not in the first area, in a case where (ix) the second movement determining section 206 determines that the RFID tag 100 has been moved out of the second area, and then (x) the first movement determining section 205, within a predetermined time period from the determination made by the second movement determining section 206, does not determine that the RFID tag has been moved out of the first area and determines that the RFID tag is not staying within the first area. Moreover, a determination other than the determinations as above can be carried out for determining the movement direction, if possible. The movement direction determining section 207 obtains, on the basis of the determinations as above, for example information indicative of a direction in which the RFID tag 100 is being moved. Generally, the movement direction determining section 207 can be constituted by an MPU, a memory, and the like. The movement direction determining section 207 is caused to operate generally by a software, which is stored in a storage medium such as a ROM. Note however that the movement direction determining section 207 can also be constituted by a hardware device (e.g., dedicated circuit).

The output section 208 outputs a result of the determination (this result is hereinafter referred to as a determination result) made by the movement direction determining section 207. For example, the output section 208 obtains the determination result made by the movement direction determining section 207, and then outputs information which is indicated by the determination result and is indicative of the movement direction of the RFID tag 100. The information to be outputted can be one indicative of whether or not the moved direction is a predetermined direction. Note here that the information can be outputted by being displayed on a display screen, printed by a printer, transmitted to an external device, stored in a storage medium, transmitted to another processing device or to another program etc., or the like. The output section 208 can include an output device such as a display screen or a printer, and can include no such device. The output section 208 can be constituted by (i) a driver software of an output device, or (ii) a driver software of an output device and the output device, for example.

Figure 13:
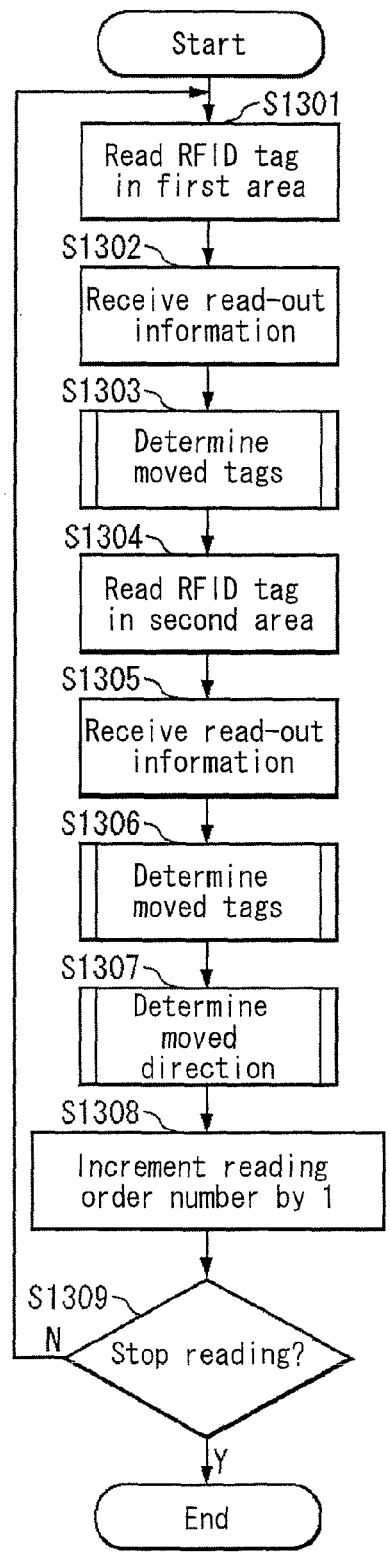
FIG. 13 is a flow diagram illustrating how the tag information processing system operates.

The following description discusses how the tag information processing system 1001 operates, with reference to a flow diagram of FIG. 13.

(Step S1301) The first tag reader/writer 22 carries out, via the first transmitting/receiving antenna 21, 1 (one) reading operation for the first area so as to read information of each of at least one RFID tag 100.

(Step S1302) The first receiving section 201 receives the information (i.e., read-out information) read by the first tag reader/writer 22.

(Step S1303) The tag information processing apparatus 20 determines, with reference to the read-out information received in Step S1302, whether or not the RFID tag 100 is a moved tag that has been moved out of the first area. This determination is same as that shown in FIG. 3, except that this determination is carried out by the first detection frequency information obtaining section 203 and the first movement determining section 205. Note however that the determination result does not need to be outputted from the output section.

(Step S1304) The second tag reader/writer 24 carries out, via the second transmitting/receiving antenna 23, one (1) reading operation for the second area so as to read information of each of at least one RFID tag 100.

(Step S1305) The second receiving section 202 receives the information (i.e., read-out information) read by the second read/write section 24.

(Step S1306) The tag information processing apparatus 20 determines, with reference to the read-out information received in Step S1305, whether or not the RFID tags 100 is a moved tag that has been moved out of the second area. This determination is same as that shown in FIG. 3, except that this determination is carried out by the second detection frequency information obtaining section 204 and the second movement determining section 206. Note however that the determination result does not need to be outputted from the output section.

(Step S1307) The tag information processing apparatus 20 determines, on the basis of the determination results made in Step S1303 and Step S1306, a movement direction of the RFID tag. This operation is described later in detail.

(Step S1308) The tag information processing apparatus 20 increments, by 1, a reading order number of the read-out information.

(Step S1309) The tag information processing apparatus 20 determines whether or not to stop reading an RFID tag 100. If it is determined to stop reading an RFID tag 100, then the operation is terminated here. If it is determined not to stop reading an RFID tag 100, then the operation returns to Step S1301.

In the following, a detailed description is given for the operation, carried out by the movement direction determining section 207, for determining the movement direction. This operation is equivalent to the operation of Step S1307 in FIG. 13.

(Step S1401) The movement direction determining section 207 assigns 1 to a counter r.

(Step S1402) The movement direction determining section 207 determines whether or not an r-th moved tag is contained in the RFID tags 100 that were determined in Step S1303 or in Step S1306 to be moved tags. If the r-th moved tag is contained, the operation proceeds to Step S1403. If not, the operation returns to a main function.

(Step S1403) The movement direction determining section 207 determines, with reference to the determination result made in Step S1303 or in Step S1306, whether or not the r-th moved tag is one having been moved out of the first area. If the r-th moved tag is determined to be the one having been moved out of the first area, then the operation proceeds to Step S1404. If the r-th moved tag is determined to be not the one having been moved out of the first area, that is, if the r-th moved tag is determined to be one having been moved out of the second area, then the operation proceeds to Step S1408.

(Step S1404) The movement direction determining section 207 determines whether or not the r-th moved tag is one having been determined before to have been moved out of the second area. This determination can be carried out, for example by checking whether or not a tag ID of the r-th moved tag is stored. Alternatively, the determination can be carried out by checking whether or not information (e.g., a flag), which indicates that the r-th moved tag has been determined before to have been moved out of the second area, is associated with the tag ID of the r-th moved tag. If the r-th moved tag is the one having been determined before to have been moved out of the second area, then the operation proceeds to Step S1405. If not, then the operation proceeds to Step S1406.

(Step S1405) The output section 208 outputs information which indicates that the movement direction of the r-th moved tag is a direction from the second area towards the first area. The information is outputted by for example being included in a database etc. Then, the operation proceeds to Step S1407. Note here that the information, of the r-th moved tag, which is stored, is deleted here so that the record is reset.

(Step S1406) The movement direction determining section 207 stores, to a storage medium such as a memory (not illustrated), information which indicates that the r-th moved tag is one having been determined to have been moved out of the first area. For example, the movement direction determining section 207 stores the tag ID of the r-th moved tag and information (e.g., a flag) which indicates that the r-th moved tag has been determined before to have been moved out of the first area, in such a way that the tag ID and the information are associated with each other. Then, the operation proceeds to Step S1407.

(Step S1407) The movement direction determining section 207 increments the counter r by 1. Then, the operation returns to Step S1402.

(Step S1408) The movement direction determining section 207 determines whether or not the r-th moved tag is one having been determined before to have been moved out of the first area. This determination can be carried out, for example by checking whether or not the tag ID of the r-th moved tag is stored. Alternatively, the determination can be carried out by checking whether or not information (e.g., a flag), which indicates that the r-th moved tag has been determined before to have been moved out of the first area, is associated with the tag ID of the r-th moved tag. If the r-th moved tag is the one having been determined before to have been moved out of the first area, then the operation proceeds to Step S1409. If not, then the operation proceeds to Step S1410.

(Step S1409) The output section 208 outputs information which indicates that the movement direction of the r-th moved tag is a direction from the first area towards the second area. The information is outputted for example by being stored in a database etc. Then, the operation proceeds to Step S1411. Note here that the information, of the r-th moved tag, which is stored, is deleted here so that the record is reset.

(Step S1410) The movement direction determining section 207 stores, to a storage medium such as a memory (not illustrated), information which indicates that the r-th moved tag is one having been determined to have been moved out of the second area. For example, the movement direction determining section 207 stores the tag ID of the r-th moved tag and information (e.g., a flag) which indicates that the r-th moved tag has been determined before to have been moved out of the second area, in such a way that the tag ID and the information are associated with each other. Then, the operation proceeds to Step S1411.

(Step S1411) The movement direction determining section 207 increments the counter r by 1. Then, the operation returns to Step S1402.

Figure 14:
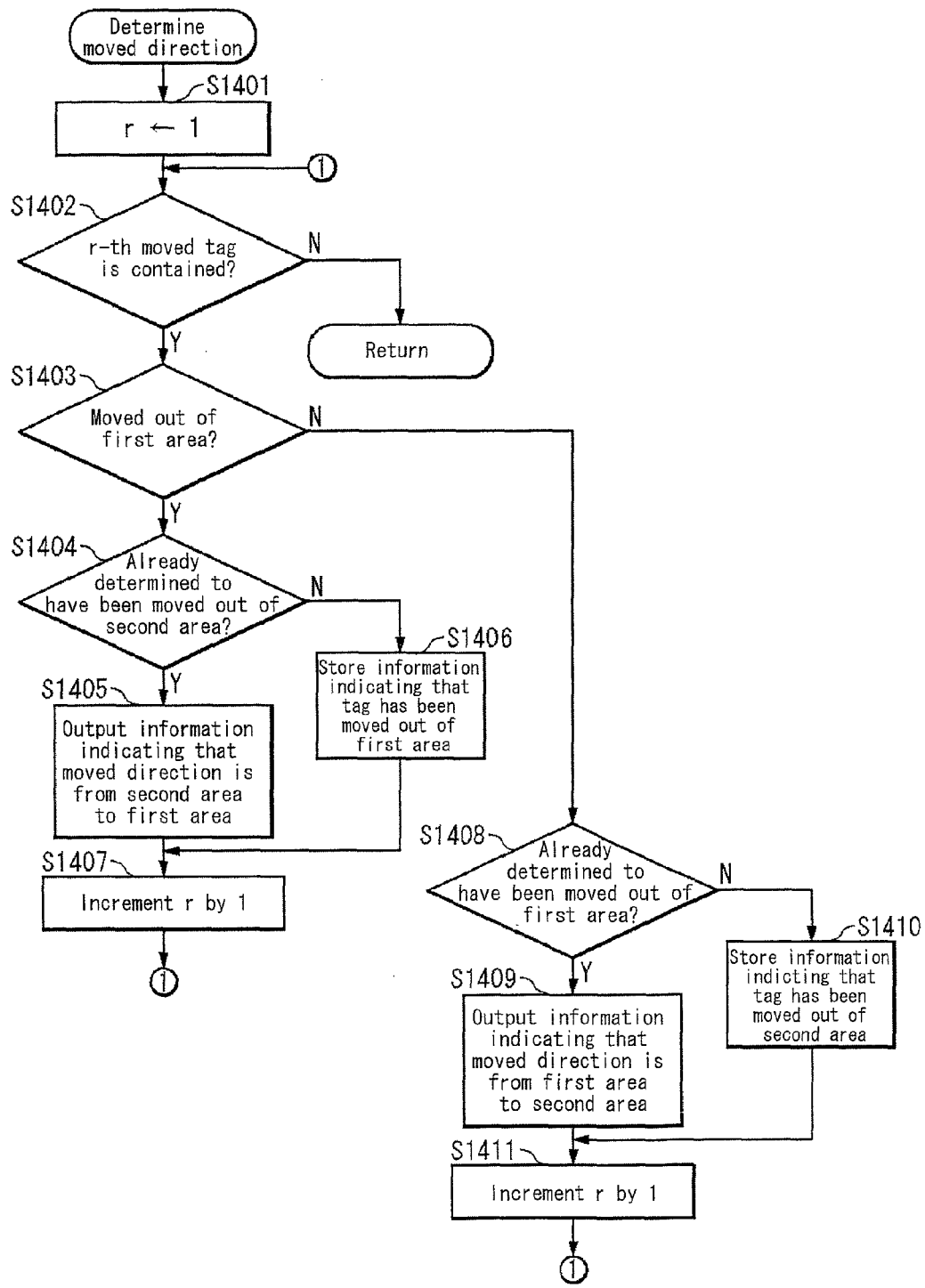
FIG. 14 is a flow diagram illustrating how the tag information processing system carries out a determination of the movement direction.

The above description for the operation of FIG. 14 was given for a case of determining either one of (i) the movement direction from the first area towards the second area or (ii) the movement direction from the second area towards the first area. Note however that the present embodiment can also be arranged as described below. If the r-th moved tag is not found in Step S1402, then (iii) the moved tag which has been determined before to have been moved out of the first area or (iv) the moved tag which has been determined before to have been moved out of the second area is determined whether or not its movement direction has been determined for more than a predetermined time period. If the movement direction has not been determined for more than a predetermined time period, then it is determined that (v) the moved tag, which has been determined before to have been moved out of the first area, has been moved out of the first area but not to the second area, or (vi) the moved tag, which has been determined before to have been moved out of the second area, has been moved out of the second area but not to the first area. Then, the determination result is outputted.

It should be noted that the operation shown in the flow diagram of FIG. 14 is terminated in the event of power-off or a termination interrupt.

The following description discusses a specific example of the present embodiment.

Figure 15:
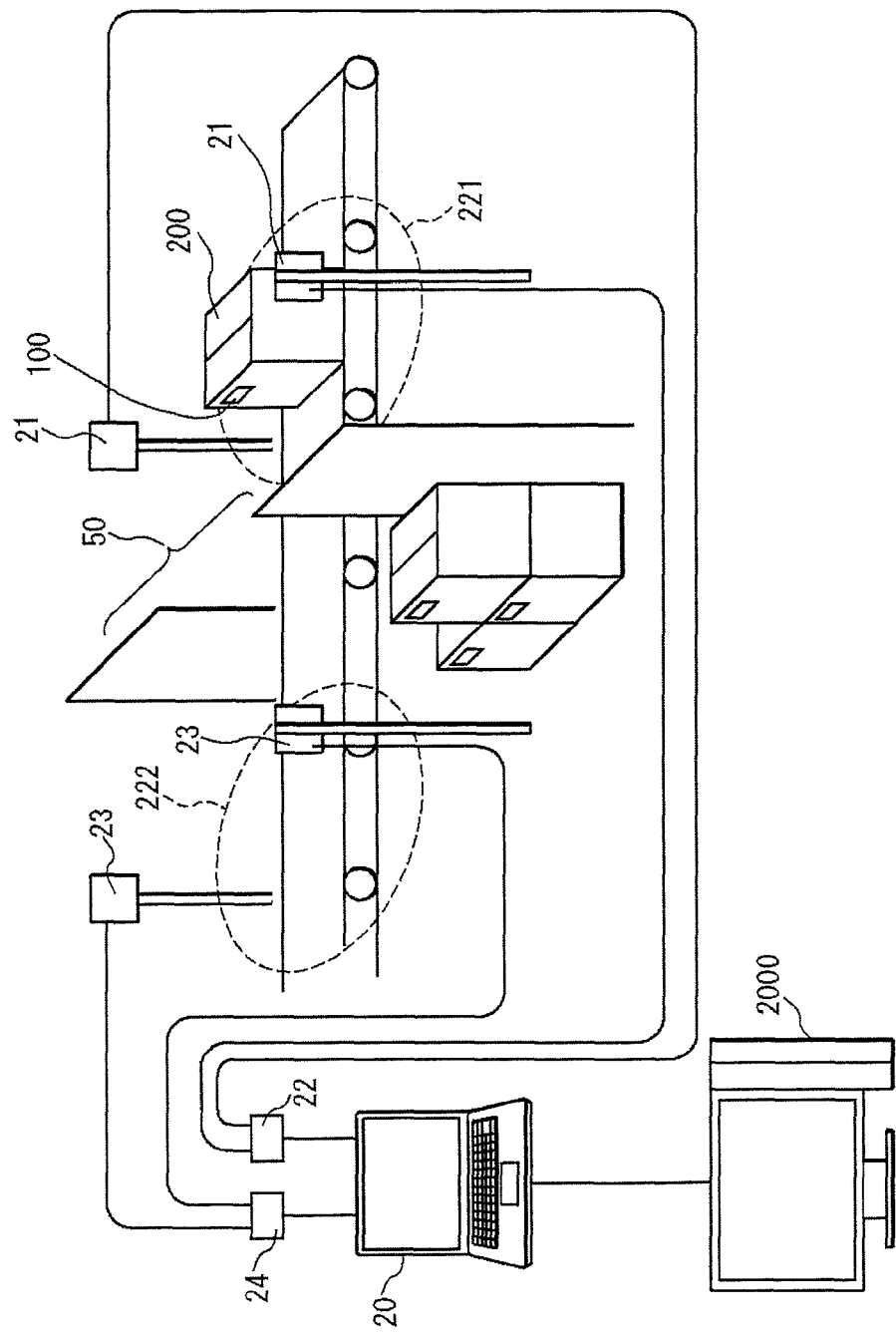
FIG. 15 is a conceptual diagram illustrating the tag information processing system.

FIG. 15 is a conceptual diagram illustrating a tag information processing system. The specific example deals with a case where packaged products, which are to be moved out, are managed in the factory by using the tag information processing system 1001. First, packaged products 200 are respectively provided with RFID tags 100, each of which has identification information unique thereto. The first transmitting/receiving antenna 21 and the second transmitting/receiving antenna 23 are provided near a gate through which the products 200 are moved. A first area 221 and a second area 222, where the RFID tags 100 are to be read, are provided so that they do not overlap each other. The tag information processing system 1001 is connected, over the network etc., with an information processing device 2000 including a database for managing a moved-out RFID tag 100. Note here that identification information of one of the RFID tags 100 is T20010. Further, note in this specific example that the values of N and L, each of which indicates how many reading operations are carried out, is equal to or greater than 4, and the threshold value M is "1".

The first tag reader/writer 22 and the second tag reader/writer 24 of the tag information processing system 1001 repeatedly carry out, at predetermined timings, the reading operation for the first area 221 where tag IDs of the RFID tags 100 is to be read. The first area 221 is positioned near the gate.

The first movement determining section 205 and the second movement determining section 206 determine whether or not each of the RFID tags 100 has been moved out of the first area and whether or not each of the RFID tags 100 has been moved out of the second area, respectively. These operations are same as those described in Embodiment 1, and thus descriptions therefor are omitted here.

The following description discusses a case where each of the packaged products 200 is moved out via a first area 221 and a second area 222 in this order. First, the packaged product 200 is moved, by a belt conveyer 30, out of the first area 221 positioned upstream of the gate 50, so as to pass through a gate 50. Accordingly, the first movement determining section 205 determines, in the same manner as in Embodiment 1, that an RFID tag 100 having the tag ID "T20010" has been moved out of the first area 221.

The movement direction determining section 207 determines whether or not (i) the tag ID "T20010" of the RFID tag 100, which has been determined by the first movement determining section 205 to have been moved out of the first area 221, and (ii) information indicating that the RFID tag 100 has been moved out of the second area are stored in a moved tag management table (which is described later), in such a way that the tag ID and the information are associated with each other. In this example, it is determined that the tag ID and the information are not stored in the moved tag management table. Then, the movement direction determining section 207 stores, to the moved tag management table (which is described later), (a) the tag ID "T20010" of the RFID tag 100, which has been determined by the first movement determining section 205 to have been moved out of the first area 221 and (b) the information indicating that the RFID tag 100 has been moved out of the first area, in such a way that the tag ID and the information are associated with each other.

Figures 16, 17:
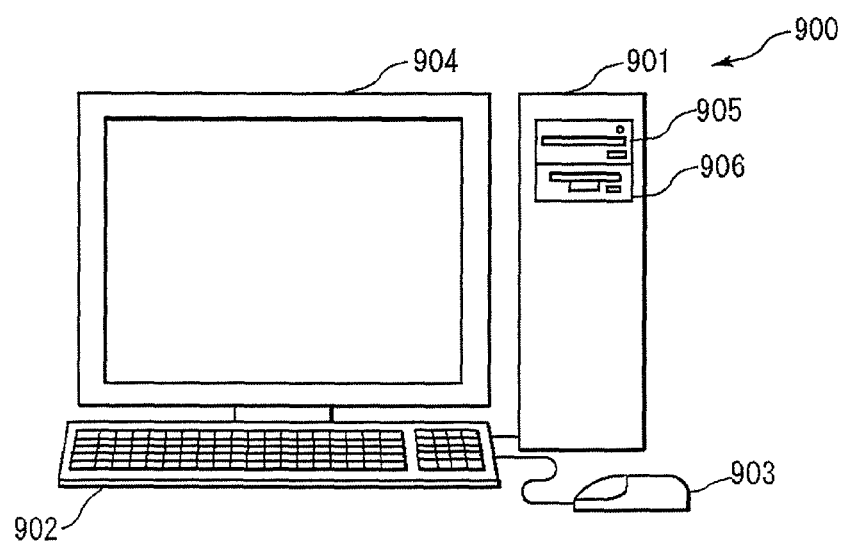
FIG. 16 is a moved tag management table in accordance with the tag information processing system.
FIG. 17 is a view schematically illustrating an exemplary external appearance of a computer system of Embodiment 2.

FIG. 16 is the moved tag management table for managing moved tags. The moved tag management table has an "ID" column, a "Moved Out of First Area" column, and a "Moved Out of Second Area" column. The "ID" column lists tag IDs of the moved tags. The "Moved Out of First Area" column lists values each of which indicates whether or not a corresponding RFID tag has been moved out of the first area. Note here that the value "1" indicates that the corresponding RFID tag has been moved out of the first area. The value "0" indicates that the corresponding RFID tag has not been determined to have been moved out of the first area. The "Moved Out of Second Area" column lists values each of which indicates whether or not a corresponding RFID tag has been moved out of the second area. Note here that the value "1" indicates that the corresponding RFID tag has been moved out of the second area. The value "0" indicates that the corresponding RFID tag has not been determined to have been moved out of the second area.

In this example, the RFID tag 100 has been determined to have been moved out of the first area 221. Therefore, the tag ID "T20010" of the RFID tag 100 is listed in the "ID" column, while the value, in the "Moved Out of First Area" column, corresponding to the tag ID "T20010" is set to "1".

Next, the product 200 has been moved to the second area 222 via the gate 50. Note here that the first movement determining section 205 and the second movement determining section 206 carry out the determination of moved tags even while the product 200 is being moved toward the second area 222 via the gate 50. However, no moved tag is found during this period because the RFID tag 100 is not being moved out of the first area 221, nor out of the second area 222.

Next, the product 200 has been moved out of the second area 222 in a direction opposite to the first area 221. In this case, the second movement determining section 206 determines that the RFID tag 100, having the tag ID "T20010", has been moved out of the second area 222.

Then, the movement direction determining section 207 determines whether or not the value in the "Moved Out of First Area" column, which value corresponds to the tag ID "T20010" of the RFID tag 100 having been determined by the second movement determining section 206 to have been moved out of the second area 222, is a value indicating that a corresponding RFID tag has been determined before to have been moved out of the first area. That is, the movement direction determining section 207 determines whether or not a corresponding value in the "Moved Out of First Area" column is "1". In this example, the value is "1". Therefore, the movement direction determining section 207 determines that the RFID tag 100 having the tag ID "T20010" has been moved out of the first area 221 in a direction towards the second area 222. Then, the output section 208 transmits out, to the information processing device 2000, the determination result made by the movement direction determining section 207. That is, the output section 208 transmits out, to the information processing device 2000, information which indicates that the RFID tag 100 having the tag ID "T2001" has been moved out of the first area 221 in the direction towards the second area 222.

This example dealt with a case where the RFID tag 100 has been moved out of the first area 221 in the direction towards the second area 222. Note however that the same applies to a case where the RFID tag 100 has been moved out of the second area 222 in a direction towards the first area 221.

As described above, according to the present embodiment, the movement direction of the RFID tag 100 is determined with reference to (i) the information which indicates that the RFID tag 100 has been moved out of the first area and (ii) the information which indicates that the RFID tag 100 has been moved out of the second area. Accordingly, it is possible not to determine the movement direction in a case where the RFID tag 100 is staying within the first area or within the second area during the movement. Thus, it is possible to prevent from accidentally determining the movement direction. For example, even in a case where an RFID tag is moved out of the first area and into the second area where it stays due to neglect etc., it is possible not to determine a movement direction of the RFID tag. As such, it is possible to improve accuracy of determination of the movement direction.

In the embodiments above, all the operations (or functions) can be implemented by a single device (or single system). Alternatively, these operations can be distributed to a plurality of devices.

Further, there is no need to say that in the embodiments above, two or more of communication means (e.g., a receiving section and an output section) included in one device can be physically constituted by one (1) medium.

Furthermore, in the embodiments above, information relevant to the operations carried out by constituent elements can be stored in a storage medium (not illustrated) temporarily or over a long time, even in a case where it is not clearly stated in the embodiments above. Examples of such information encompass: information accepted by a constituent element; information obtained by a constituent element; information selected by a constituent element; information generated by a constituent element; information transmitted by a constituent element; information received by a constituent element; and a threshold value, a mathematical expression, and an address which are used in operations carried out by the constituent elements. Such information can be stored in the storage medium (not illustrated) by a constituent element, or can be stored by a storing section (not illustrated). Further, such information can be read out from the storage medium (not illustrated) by a constituent element, or can be read out by a reading section (not illustrated).

Moreover, in the embodiments above, each of the constituent elements can be constituted by a dedicated hardware device. Alternatively, each of the constituent elements can be caused to operate by executing a software program, if possible. For example, each of the constituent elements can be caused to operate in such a manner that a program executing section (e.g., CPU) reads out a software program from a storage medium (e.g., a hard disk or a semiconductor memory), and then execute the software program.

The software, of the present embodiment, which constitutes the tag information processing apparatus is a program for causing a computer to operate as: a receiving section for receiving read-out information of an RFID tag, the read-out information obtained through N reading operations (where N represents an integer equal to or greater than 2) carried out for an RFID tag-reading area; a detection frequency information obtaining section for obtaining detection frequency information on the basis of the read-out information received by the receiving section, the detection frequency information indicating a detection frequency at which the read-out information of the RFID tag is detected in the N reading operations; a movement determining section for determining whether or not the RFID tag has been moved out of the RFID tag-reading area, wherein, in a case where the detection frequency information obtained by the detection frequency information obtaining section indicates that the detection frequency at which the read-out information of the RFID tag is detected is low, the movement determining section determines that the RFID tag has been moved out of the RFID tag-reading area; and an output section for outputting a result of the determination made by the movement determining section.

Alternatively, the software is a program for causing a computer to operate as: a first receiving section for receiving first read-out information of an RFID tag, the first read-out information obtained through N reading operations (where N represents an integer equal to or greater than 2) carried out for a first area; a second receiving section for receiving second read-out information of the RFID tag, the second read-out information obtained through L reading operations (where L represents an integer equal to or greater than 2) carried out for a second area which does not overlap the first area; a first detection frequency information obtaining section for obtaining first detection frequency information on the basis of the first read-out information received by the first receiving section, the first detection frequency information indicating a detection frequency at which the first read-out information of the RFID tag is detected in the N reading operations carried out for the first area; a second detection frequency information obtaining section for obtaining second detection frequency information on the basis of the second read-out information received by the second receiving section, the second detection frequency information indicating a detection frequency at which the second read-out information of the RFID tag is detected in the L reading operations carried out for the second area; a first movement determining section for determining whether or not the RFID tag has been moved out of the first area, wherein, in a case where the first detection frequency information obtained by the first detection frequency information obtaining section indicates that the detection frequency at which the first read-out information of the RFID tag is detected is low, the first movement determining section determines that the RFID tag has been moved out of the first area; a second movement determining section for determining whether or not the RFID tag has been moved out of the second area, wherein, in a case where the second detection frequency information obtained by the second detection frequency information obtaining section indicates that the detection frequency at which the second read-out information of the RFID tag is detected is low, the second movement determining section determines that the RFID tag has been moved out of the second area; a movement direction determining section for determining a movement direction on the basis of results of the determination made by the first movement determining section and the determination made by second movement determining section; and an output section for outputting a result of the determination made by the movement direction determining section.

It should be noted that the program does not include, in its steps such as steps of transmitting information and receiving information, a process carried out by a hardware device (i.e., the process that can be carried out only by a hardware device). Examples of such process encompass a process, in the step of transmitting information, which is carried out by using a modem or an interface card.

Further, it should be noted that functions implemented by the program do not encompass a function that can be implemented only by a hardware device. Examples of such function encompass those which can be implemented only by a hardware device such as a modem or an interface card, which is used in an obtaining section for obtaining information, in an output section for outputting information, or in the like section.

The program can be executed by a single computer or by a plurality of computers. That is, both of integrated processing carried out by a single computer and distributed processing carried out by a plurality of computers are applicable for executing the program.

FIG. 17 is a view schematically illustrating an exemplary external appearance of a computer which serves as a tag information processing apparatus in accordance with the embodiments above. Each of the embodiments above can be constituted by a computer hardware and a computer program which runs on the computer hardware.

According to FIG. 17, a computer system 900 includes: a computer 901 including a CD-ROM (Compact Disk Read Only Memory) drive 905 and an FD (Floppy [registered trademark] Disk) drive 906; a keyboard 902; a mouse 903; and a monitor 904.

Figure 18:
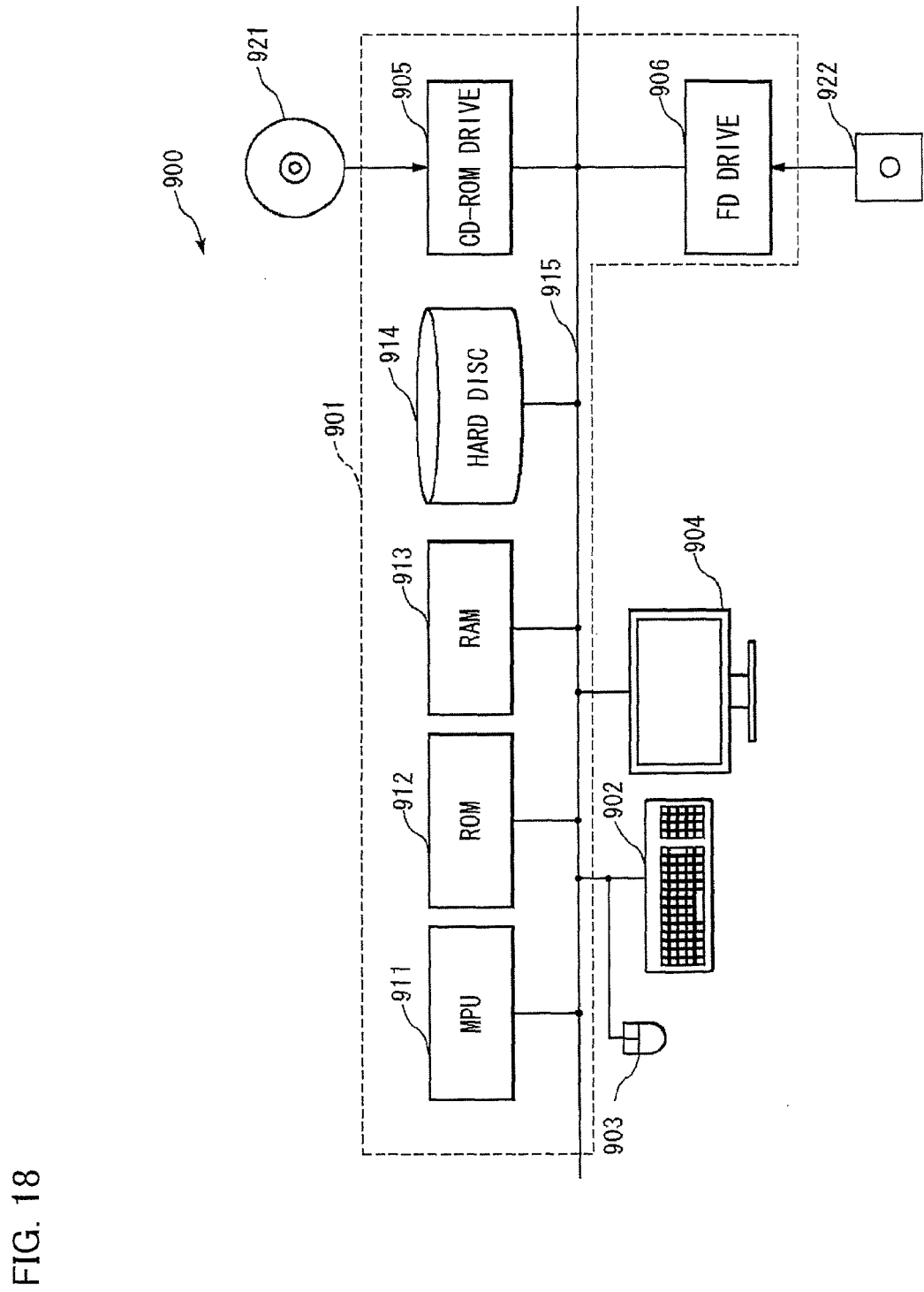
FIG. 18 illustrates an exemplary configuration of the computer system of Embodiment 2.

FIG. 18 illustrates an internal configuration of the computer system 900. According to FIG. 18, the computer 901 includes, as well as the CD-ROM drive 905 and the FD drive 906, an MPU (Micro Processing Unit) 911; an ROM 912 for storing a program such as a boot program; an RAM (Random Access Memory) 913, which is connected with the MPU 911 and serves as a temporary memory space for temporarily storing an instruction executed by an application program etc.; a hard disk 914 for storing the application program, a system program, and data; and a connecting bus 915 through which the MPU 911 and ROM 912 etc. are connected with one another. Further, the computer 901 can include a network card (not illustrated) which allows connection with LAN.

A program which causes the computer system 900 to function as the tag information processing apparatus in accordance with the embodiments above can be stored in a CD-ROM 921 or in an FD 922. The CD-ROM 921 or the FD 922 is inserted into the CD-ROM drive 905 or the FD drive 906, respectively, so that the program is sent to the hard disk 914. Alternatively, the program can be sent to the computer 901 over the network (not illustrated) so as to be stored in the hard disk 914. The program is loaded into the RAM 913 so as to be executed. Alternatively, the program can be loaded directly from the CD-ROM 921, from the FD 922, or from the network.

The program does not necessarily have to include an operating system (OS) that causes the computer 901 to function as the tag information processing apparatus in accordance with the embodiments above, a third-party program, or the like. The program can contain only an instruction, which invokes a required function (module) under controlled environments so that a desired result is obtained. How the computer system 900 operates is well known, and thus a detailed description therefor is omitted here.

There is no need to say that the invention is not limited to the description of the embodiments above, but may be altered. An embodiment based on a proper combination of technical means disclosed in different embodiments is encompassed in the technical scope of the invention.

As so far described, a tag information processing apparatus of the present invention includes: a receiving section for receiving read-out information of an RFID tag, the read-out information obtained through N reading operations (where N represents an integer equal to or greater than 2) carried out for an RFID tag-reading area; a detection frequency information obtaining section for obtaining detection frequency information on the basis of the read-out information received by the receiving section, the detection frequency information indicating a detection frequency at which the read-out information of the RFID tag is detected in the N reading operations; a movement determining section for determining whether or not the RFID tag has been moved out of the RFID tag-reading area, wherein, in a case where the detection frequency information obtained by the detection frequency information obtaining section indicates that the detection frequency at which the read-out information of the RFID tag is detected is low, the movement determining section determines that the RFID tag has been moved out of the RFID tag-reading area; and an output section for outputting a result of the determination made by the movement determining section.

According to the configuration, it is possible to determine, with reference to the detection frequency at which the tag ID (i.e., the read-out information) of the RFID tag is detected in the N reading operations carried out for the RFID tag-reading area, whether or not the RFID tag has been moved out of the RFID tag-reading area. Accordingly, it is possible to determine whether or not the RFID tag has been moved out of the RFID tag-reading area, while taking into consideration a successful reading rate. In other words, it is possible to determine whether or not the RFID tag is a moved tag. As such, it is possible to accurately determine whether or not the RFID tag has been moved out of the RFID tag-reading area, or whether or not the RFID tag is staying within the RFID tag-reading area.

The tag information processing apparatus of the present invention is configured such that the detection frequency information obtaining section obtains the detection frequency information, on the RFID tag, which has been read in a first reading operation of the N reading operations; and the movement determining section determines whether or not the RFID tag has been moved out of the RFID tag-reading area with reference to the detection frequency information, on the RFID tag, which has been read in the first reading operation of the N reading operations.

According to the configuration, it is possible to determine, as to only RFID tag having been determined to be present in the RFID tag-reading area, whether or not the RFID tag is a moved tag. This makes it unnecessary to know, in advance, identification information of the RFID tag that is present in the RFID tag-reading area.

The tag information processing apparatus of the present invention is configured such that the movement determining section compares the detection frequency indicated by the detection frequency information with a threshold frequency specified in advance, and in a case where the detection frequency is lower than the threshold frequency, the movement determining section determines that the RFID tag has been moved out of the RFID tag-reading area.

According to the configuration, it is possible to more accurately determine whether or not the RFID tag has been moved out of the RFID tag-reading area, by setting the threshold frequency by taking into consideration a successful reading rate of the RFID tag.

The tag information processing apparatus of the present invention is configured such that the movement determining section determines that, only in a case where the detection frequency information indicates that the RFID tag has been read only once in the N reading operations, the RFID tag has been moved out of the RFID tag-reading area.

According to the configuration, it is possible to determine whether or not the RFID tag has been moved out of the RFID tag-reading area most accurately for a case where a successful reading rate of the RFID tag is low.

The tag information processing apparatus of the present invention is configured such that the output section outputs the result of the determination, the result serving as identification information which identifies the RFID tag having been determined by the movement determining section to have been moved out of the RFID tag-reading area.

According to the configuration, it is possible to manage moved tags by using identification information of RFID tags.

The tag information processing apparatus of the present invention is configured such that, as to the RFID tag, for which it has already been determined whether or not the RFID tag has been moved out of the RFID tag-reading area, the detection frequency information obtaining section does not further obtain the detection frequency information on the RFID tag and the movement determining section does not further determine whether or not the RFID tag has been moved out of the RFID tag-reading area.

According to the configuration, the RFID tag, for which it has already been determined whether or not the RFID tag has been moved out of the RFID tag-reading area, is not determined again. As such, it is possible to improve efficiency of the operations so that the operations are quickly carried out.

A tag information processing system of the present invention includes: a transmitting/receiving antenna for transmitting and receiving radio waves to and from an RFID tag-reading area; a tag reader/writer for obtaining read-out information of an RFID tag in the RFID tag-reading area by carrying out, via the transmitting/receiving antenna, N reading operations (where N represents an integer equal to or greater than 2) for the RFID tag-reading area; a receiving section for receiving the read-out information obtained by the tag reader/writer; a detection frequency information obtaining section for obtaining detection frequency information on the basis of the read-out information received by the receiving section, the detection frequency information indicating a detection frequency at which the read-out information of the RFID tag is detected in the N reading operations; a movement determining section for determining whether or not the RFID tag has been moved out of the RFID tag-reading area, wherein, in a case where the detection frequency information obtained by the detection frequency information obtaining section indicates that the detection frequency at which the read-out information of the RFID tag is detected is low, the movement determining section determines that the RFID tag has been moved out of the RFID tag-reading area; and an output section for outputting a result of the determination made by the movement determining section.

According to the configuration, it is possible to determine whether or not the RFID tag is a moved tag while taking into consideration a successful reading rate of the RFID tag. As such, it is possible to accurately determine whether or not the RFID tag is a moved tag.

The tag information processing apparatus of the present invention includes: a first receiving section for receiving first read-out information of an RFID tag, the first read-out information obtained through N reading operations (where N represents an integer equal to or greater than 2) carried out for a first area; a second receiving section for receiving second read-out information of the RFID tag, the second read-out information obtained through L reading operations (where L represents an integer equal to or greater than 2) carried out for a second area which does not overlap the first area; a first detection frequency information obtaining section for obtaining first detection frequency information on the basis of the first read-out information received by the first receiving section, the first detection frequency information indicating a detection frequency at which the first read-out information of the RFID tag is detected in the N reading operations carried out for the first area; a second detection frequency information obtaining section for obtaining second detection frequency information on the basis of the second read-out information received by the second receiving section, the second detection frequency information indicating a detection frequency at which the second read-out information of the RFID tag is detected in the L reading operations carried out for the second area; a first movement determining section for determining whether or not the RFID tag has been moved out of the RFID tag-reading area, wherein, in a case where the first detection frequency information obtained by the first detection frequency information obtaining section indicates that the detection frequency at which the first read-out information of the RFID tag is detected is low, the first movement determining section determines that the RFID tag has been moved out of the first area; a second movement determining section for determining whether or not the RFID tag has been moved out of the RFID tag-reading area, wherein, in a case where the second detection frequency information obtained by the second detection frequency information obtaining section indicates that the detection frequency at which the second read-out information of the RFID tag is detected is low, the second movement determining section determines that the RFID tag has been moved out of the second area; a movement direction determining section for determining a movement direction on the basis of results of the determination made by the first movement determining section and the determination made by the second movement determining section; and an output section for outputting a result of the determination made by the movement direction determining section.

According to the configuration, it is possible to accurately determine the movement direction in which the RFID tag is being moved. Particularly, it is possible to prevent from accidentally determining the movement direction of an RFID tag which is staying within the first area or within the second area.

The tag information processing system of the present invention includes: a first transmitting/receiving antenna for transmitting and receiving radio waves to and from a first area; a first tag reader/writer for obtaining first read-out information of an RFID tag in the first area by carrying out, via the first transmitting/receiving antenna, N reading operations (where N represents an integer equal to or greater than 2) for the first area; a first receiving section for receiving the first read-out information obtained by the first tag reader/writer; a first detection frequency information obtaining section for obtaining first detection frequency information on the basis of the first read-out information received by the first receiving section, the first detection frequency information indicating a detection frequency at which the first read-out information of the RFID tag is detected in the N reading operations carried out for the first area; a second transmitting/receiving antenna for transmitting and receiving radio waves to and from a second area which does not overlap the first area; a second tag reader/writer for obtaining second read-out information of the RFID tag being present in the second area by carrying out, via the second transmitting/receiving antenna, L reading operations (where L represents an integer equal to or greater than 2) for the second area; a second receiving section for receiving the second read-out information obtained by the second tag reader/writer; a second detection frequency information obtaining section for obtaining second detection frequency information on the basis of the second read-out information received by the second receiving section, the second detection frequency information indicating a detection frequency at which the second read-out information of the RFID tag is detected in the L reading operations carried out for the second area; a first movement determining section for determining whether or not the RFID tag has been moved out of the RFID tag-reading area, wherein, in a case where the first detection frequency information obtained by the first detection frequency information obtaining section indicates that the detection frequency at which the first read-out information of the RFID tag is detected is low, the first movement determining section determines that the RFID tag has been moved out of the first area; a second movement determining section for determining whether or not the RFID tag has been moved out of the RFID tag-reading area, wherein, in a case where the second detection frequency information obtained by the second detection frequency information obtaining section indicates that the detection frequency at which the second read-out information of the RFID tag is detected is low, the second movement determining section determines that the RFID tag has been moved out of the second area; a movement direction determining section for determining a movement direction on the basis of results of the determination made by the first movement determining section and the determination made by the second movement determining section; and an output section for outputting a result of the determination made by the movement direction determining section.

According to the configuration, it is possible to accurately determine the movement direction in which the RFID tag is being moved. Particularly, it is possible to prevent from accidentally determining the movement direction of an RFID tag which is staying within the first area or within the second area.

The invention is not limited to the description of the embodiments above, but may be altered within the scope of the claims. That is, an embodiment based on a proper combination of technical means disclosed in different embodiments is encompassed in the technical scope of the invention.

INDUSTRIAL APPLICABILITY

As so far described, each of a tag information processing apparatus and the like in accordance with the present invention is suitably used as a device which processes information read out from an RFID tag or as the like device. Particularly, each of the tag information processing apparatus and the like in accordance with the present invention is useful as a device which determines whether or not the RFID tag has been moved out of a first area, where the RFID tag is to be read, or as the like device.

The invention claimed is:

1. A tag information processing apparatus, comprising:
a receiving section for receiving read-out information of an RFID tag, the read-out information obtained through N reading operations (where N represents an integer equal to or greater than 2) carried out for an RFID tag-reading area;
a detection frequency information obtaining section for obtaining detection frequency information on the basis of the read-out information received by the receiving section, the detection frequency information indicating a detection frequency at which the read-out information of the RFID tag is detected in the N reading operations, the detection frequency information obtaining section obtaining the detection frequency information on the RFID tag whose read-out information was read in a first reading operation of the N reading operations;
a movement determining section for determining whether or not the RFID tag has been moved out of the RFID tag-reading area, wherein, in a case where the detection frequency information obtained by the detection frequency information obtaining section indicates that the detection frequency at which the read-out information of the RFID tag is detected is low, the movement determining section determines that the RFID tag has been moved out of the RFID tag-reading area, the movement determining section carrying out the determination of whether or not the RFID tag has been moved out of the RFID tag-reading area with reference to the detection frequency information on the RFID tag whose read-out information was read in the first reading operation, wherein the RFID tag subjected to the determination is the only RFID tag whose read-out information was read in the first reading operation; and
an output section for outputting a result of the determination made by the movement determining section;
the receiving section also receiving identification information which is included in the read-out information of the RFID tag that was subjected to a determination of whether or not it was moved out of the RFID tag-reading area, wherein the identification information indicates that the RFID tag was subjected to the determination, and the RFID tag that was subjected to the determination is not subjected to another determination of whether or not it has moved out of the RFID tag-reading area for a predetermined number of reading operations or for a predetermined period of time.

2. The tag information processing apparatus according to claim 1, wherein:
the movement determining section compares the detection frequency indicated by the detection frequency information with a threshold frequency specified in advance, and in a case where the detection frequency is lower than the threshold frequency, the movement determining section determines that the RFID tag has been moved out of the RFID tag-reading area.

3. The tag information processing apparatus according to claim 1, wherein:
the movement determining section determines that, only in a case where the detection frequency information indicates that the RFID tag has been read only once in the N reading operations, the RFID tag has been moved out of the RFID tag-reading area.

4. The tag information processing apparatus according to claim 1, wherein:
the output section outputs the result of the determination, the result serving as the identification information which indicates that the RFID tag was subjected to the determination.

5. The tag information processing apparatus according to claim 1, wherein
the detection frequency information obtaining section removes the identification information of the RFID tag that was subjected to the determination of whether or not it has moved out of the RFID tag-reading area from the read-out information received by the receiving section, after the RFID tag has been subjected to the determination.

6. The tag information processing apparatus according to claim 1, further comprising a list of identification information, wherein identification information of an RFID tag that has been subjected to a determination, by the movement determining section, of whether or not it has moved out of the RFID tag-reading area is added to the list.

7. A tag information processing system, comprising:
a transmitting/receiving antenna for transmitting and receiving radio waves to and from an RFID tag-reading area;
a tag reader/writer for obtaining read-out information of an RFID tag in the RFID tag-reading area by carrying out, via the transmitting/receiving antenna, N reading operations (where N represents an integer equal to or greater than 2) for the RFID tag-reading area;
a receiving section for receiving the read-out information obtained by the tag reader/writer;
a detection frequency information obtaining section for obtaining detection frequency information on the basis of the read-out information received by the receiving section, the detection frequency information indicating a detection frequency at which the read-out information of the RFID tag is detected in the N reading operations, the detection frequency information obtaining section obtaining the detection frequency information on the RFID tag whose read-out information was read in a first reading operation of the N reading operations;
a movement determining section for determining whether or not the RFID tag has been moved out of the RFID tag-reading area, wherein, in a case where the detection frequency information obtained by the detection frequency information obtaining section indicates that the detection frequency at which the read-out information of the RFID tag is detected is low, the movement determining section determines that the RFID tag has been moved out of the RFID tag-reading area, the movement determining section carrying out the determination of whether or not the RFID tag has been moved out of the RFID tag-reading area with reference to the detection frequency information on the RFID tag whose read-out information was read in the first reading operation, wherein the RFID tag subjected to the determination is the only RFID tag whose read-out information was read in the first reading operation; and
an output section for outputting a result of the determination made by the movement determining section;
the receiving section also receiving identification information which is included in the read-out information of the RFID tag that was subjected to a determination of whether or not it was moved out of the RFID tag-reading area, wherein the identification information indicates that the RFID tag was subjected to the determination, and the RFID tag that was subjected to the determination is not subjected to another determination of whether or not it has moved out of the RFID tag-reading area for a predetermined number of reading operations or for a predetermined period of time.

8. A tag information processing apparatus, comprising:
a first receiving section for receiving first read-out information of an RFID tag, the first read-out information obtained through N reading operations (where N represents an integer equal to or greater than 2) carried out for a first area;
a second receiving section for receiving second read-out information of the RFID tag, the second read-out information obtained through L reading operations (where L represents an integer equal to or greater than 2) carried out for a second area which does not overlap the first area;
a first detection frequency information obtaining section for obtaining first detection frequency information on the basis of the first read-out information received by the first receiving section, the first detection frequency information indicating a detection frequency at which the first read-out information of the RFID tag is detected in the N reading operations carried out for the first area, the first detection frequency information obtaining section obtaining the first detection frequency information on the RFID tag whose first read-out information was read in a first reading operation of the N reading operations;
a second detection frequency information obtaining section for obtaining second detection frequency information on the basis of the second read-out information received by the second receiving section, the second detection frequency information indicating a detection frequency at which the second read-out information of the RFID tag is detected in the L reading operations carried out for the second area, the second detection frequency information obtaining section obtaining the second detection frequency information on the RFID tag whose second read-out information was read in a first reading operation of the L reading operations;
a first movement determining section for determining whether or not the RFID tag has been moved out of the first area, wherein, in a case where the first detection frequency information obtained by the first detection frequency information obtaining section indicates that the detection frequency at which the first read-out information of the RFID tag is detected is low, the first movement determining section determines that the RFID tag has been moved out of the first area, the first movement determining section carrying out the first determination of whether or not the RFID tag has been moved out of the first area with reference to the first detection frequency information on the RFID tag whose first read-out information was read in the first reading operation of the N reading operations, wherein the RFID tag subjected to the first determination is the only RFID tag whose first read-out information was read in the first reading operation of the N reading operations;

a second movement determining section for determining whether or not the RFID tag has been moved out of the second area, wherein, in a case where the second detection frequency information obtained by the second detection frequency information obtaining section indicates that the detection frequency at which the second read-out information of the RFID tag is detected is low, the second movement determining section determines that the RFID tag has been moved out of the second area, the second movement determining section carrying out the second determination of whether or not the RFID tag has been moved out of the second area with reference to the second detection frequency information on the RFID tag whose second read-out information was read in the first reading operation of the L reading operations, wherein the RFID tag subjected to the second determination is the only RFID tag whose second read-out information was read in the first reading operation of the L reading operations;

a movement direction determining section for determining a movement direction on the basis of results of the determination made by the first movement determining section and the determination made by the second movement determining section; and an output section for outputting a result of the determination made by the movement direction determining section;

the first and second receiving sections also receiving identification information which is included in the read-out information of the RFID tag that was subjected to a determination of whether or not it was moved out of the first or second areas, wherein the identification information indicates that the RFID tag was subjected to a determination in at least one of the first and second areas, and the RFID tag that was subjected to a determination is not subjected to another determination of whether or not it has moved out of the at least one of the first and second areas for a predetermined number of reading operations or for a predetermined period of time.

9. The tag information processing apparatus according to claim 8, wherein:

at least one of the first and second movement direction determining sections determines that the RFID tag has been moved in a direction from the first area towards the second area via the first area and the second area, in a case where (i) the first movement determining section determines that the RFID tag has been moved out of the first area, and then (ii) the second movement determining section determines, within a predetermined period from the determination made by the first movement determining section, that the RFID tag has been moved out of the second area.

10. A tag information processing system, comprising:

a first transmitting/receiving antenna for transmitting and receiving radio waves to and from a first area;

a first tag reader/writer for obtaining first read-out information of an RFID tag in the first area by carrying out, via the first transmitting/receiving antenna, N reading operations (where N represents an integer equal to or greater than 2) for the first area;

a first receiving section for receiving the first read-out information obtained by the first tag reader/writer;

a first detection frequency information obtaining section for obtaining first detection frequency information on the basis of the first read-out information received by the first receiving section, the first detection frequency information indicating a detection frequency at which the first read-out information of the RFID tag is detected in the N reading operations carried out for the first area, the first detection frequency information obtaining section obtaining the first detection frequency information on the RFID tag whose first read-out information was read in a first reading operation of the N reading operations;

a second transmitting/receiving antenna for transmitting and receiving radio waves to and from a second area which does not overlap the first area;

a second tag reader/writer for obtaining second read-out information of the RFID tag being present in the second area by carrying out, via the second transmitting/receiving antenna, L reading operations (where L represents an integer equal to or greater than 2) for the second area;

a second receiving section for receiving the second read-out information obtained by the second tag reader/writer;

a second detection frequency information obtaining section for obtaining second detection frequency information on the basis of the second read-out information received by the second receiving section, the second detection frequency information indicating a detection frequency at which the second read-out information of the RFID tag is detected in the L reading operations carried out for the second area, the second detection frequency information obtaining section obtaining the second detection frequency information on the RFID tag whose second read-out information was read in a first reading operation of the L reading operations;

a first movement determining section for determining whether or not the RFID tag has been moved out of the first area, wherein, in a case where the first detection frequency information obtained by the first detection frequency information obtaining section indicates that the detection frequency at which the first read-out information of the RFID tag is detected is low, the first movement determining section determines that the RFID tag has been moved out of the first area, the first movement determining section carrying out the first determination of whether or not the RFID tag has been moved out of the first area with reference to the first detection frequency information on the RFID tag whose first read-out information was read in the first reading operation of the N reading operations, wherein the RFID tag subjected to the first determination is the only RFID tag whose first read-out information was read in the first reading operation of the N reading operations;

a second movement determining section for determining whether or not the RFID tag has been moved out of the second area, wherein, in a case where the second detection frequency information obtained by the second detection frequency information obtaining section indicates that the detection frequency at which the second read-out information of the RFID tag is detected is low, the second movement determining section determines that the RFID tag has been moved out of the second area, the second movement determining section carrying out the second determination of whether or not the RFID tag has been moved out of the second area with reference to the second detection frequency information on the RFID tag whose second read-out information was read in the first reading operation of the L reading operations, wherein the RFID tag subjected to the second determination is the only RFID tag whose second read-out information was read in the first reading operation of the L reading operations;

a movement direction determining section for determining a movement direction on the basis of results of the determination made by the first movement determining section and the determination made by the second movement determining section; and an output section for outputting a result of the determination made by the movement direction determining section;

the first and second receiving sections also receiving identification information which is included in the read-out information of the RFID tag that was subjected to a determination of whether or not it was moved out of the first or second areas, wherein the identification information indicates that the RFID tag was subjected to a determination in at least one of the first and second areas, and the RFID tag that was subjected to a determination is not subjected to another determination of whether or not it has moved out of the at least one of the first and second areas for a predetermined number of reading operations or for a predetermined period of time.

11. A tag information processing system, comprising:

a transmitting/receiving antenna for transmitting and receiving radio waves to and from an RFID tag-reading area;

a tag reader/writer for obtaining read-out information of an RFID tag being present in the RFID tag-reading area by carrying out, via the transmitting/receiving antenna, reading operations for the RFID tag-reading area at predetermined timings;

a receiving section for receiving, out of the read-out information obtained by the tag reader/writer, read-out information obtained in last N reading operations (where N represents an integer equal to or greater than 2);

a detection frequency information obtaining section for obtaining detection frequency information on the basis of the read-out information received by the receiving section, the detection frequency information indicating a detection frequency at which the read-out information of the RFID tag is detected in the N reading operations, the detection frequency information obtaining section obtaining the detection frequency information on the RFID tag whose read-out information was read in a first reading operation of the N reading operations;

a movement determining section for determining whether or not the RFID tag has been moved out of the RFID tag-reading area, wherein, in a case where the detection frequency information obtained by the detection frequency information obtaining section indicates that the detection frequency at which the read-out information of the RFID tag is detected is low, the movement determining section determines that the RFID tag has been moved out of the RFID tag-reading area, the movement determining section carrying out the determination of whether or not the RFID tag has been moved out of the RFID tag-reading area with reference to the detection frequency information on the RFID tag whose read-out information was read in the first reading operation, wherein the RFID tag subjected to the determination is the only RFID tag whose read-out information was read in the first reading operation; and an output section for outputting a result of the determination made by the movement determining section;

the receiving section also receiving identification information which is included in the read-out information of the RFID tag that was subjected to a determination of whether or not it was moved out of the RFID tag-reading area, wherein the identification information indicates that the RFID tag was subjected to the determination, and the RFID tag that was subjected to the determination is not subjected to another determination of whether or not it has moved out of the RFID tag-reading area for a predetermined number of reading operations or for a predetermined period of time.

* * * * *